(12) United States Patent
Kajiya

(10) Patent No.: US 9,495,027 B2
(45) Date of Patent: Nov. 15, 2016

(54) DATA PROCESSING DEVICE AND DATA PROCESSING METHOD

(71) Applicant: FUJITSU LIMITED, Kawasaki-shi, Kanagawa (JP)

(72) Inventor: Hirokatsu Kajiya, Yoshikawa (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/074,406

(22) Filed: Nov. 7, 2013

(65) Prior Publication Data

US 2014/0198063 A1 Jul. 17, 2014

(30) Foreign Application Priority Data

Jan. 16, 2013 (JP) ................. 2013-005515

(51) Int. Cl.
 *G06F 3/041* (2006.01)
 *G06F 3/0488* (2013.01)

(52) U.S. Cl.
 CPC ........... *G06F 3/041* (2013.01); *G06F 3/04883* (2013.01)

(58) Field of Classification Search
 USPC ............ 345/173, 174, 156, 179, 184; 702/3; 715/765
 See application file for complete search history.

(56) References Cited

U.S. PATENT DOCUMENTS

| 2011/0001694 A1 | 1/2011 | Homma et al. | |
| 2011/0175832 A1* | 7/2011 | Miyazawa et al. | 345/173 |
| 2012/0127209 A1 | 5/2012 | Yajima | |
| 2012/0150446 A1* | 6/2012 | Chang | G06Q 10/10 702/3 |
| 2012/0206380 A1* | 8/2012 | Zhao et al. | 345/173 |
| 2012/0223894 A1* | 9/2012 | Zhao et al. | 345/173 |
| 2012/0304199 A1 | 11/2012 | Homma et al. | |
| 2013/0181908 A1* | 7/2013 | Santiago | G06F 3/041 345/173 |
| 2013/0185663 A1* | 7/2013 | Wolfram | G06F 17/10 715/765 |
| 2014/0035861 A1* | 2/2014 | Soo | G06F 3/044 345/174 |
| 2014/0085223 A1* | 3/2014 | Liang | G06F 3/017 345/173 |

FOREIGN PATENT DOCUMENTS

| JP | 2006-236143 | 9/2006 |
| JP | 2007-212975 | 8/2007 |
| JP | 2011-014044 | 1/2011 |
| JP | 2011-170834 | 9/2011 |
| JP | 2012-247960 | 12/2012 |
| WO | 2011/152001 | 12/2011 |

OTHER PUBLICATIONS

JPOA—Office Action of Japanese Patent Application No. 2013-005515 dated Jun. 21, 2016, with English translation of the relevant part of the Office Action.

* cited by examiner

*Primary Examiner* — Thuy Pardo
(74) *Attorney, Agent, or Firm* — Fujitsu Patent Center

(57) ABSTRACT

A data processing device includes a processor that executes a procedure. The procedure includes: (a) detecting contact with an operation face and outputting contact position data expressing a contact position at the operation face; (b) predicting a contact operation based on a number of contact positions identified based on the contact position data output at (a) prior to the contact operation to the operation face being identified based on a time series of the contact positions expressed by the contact position data output at (a); and (c) executing processing according to the contact operation predicted at (b).

20 Claims, 36 Drawing Sheets

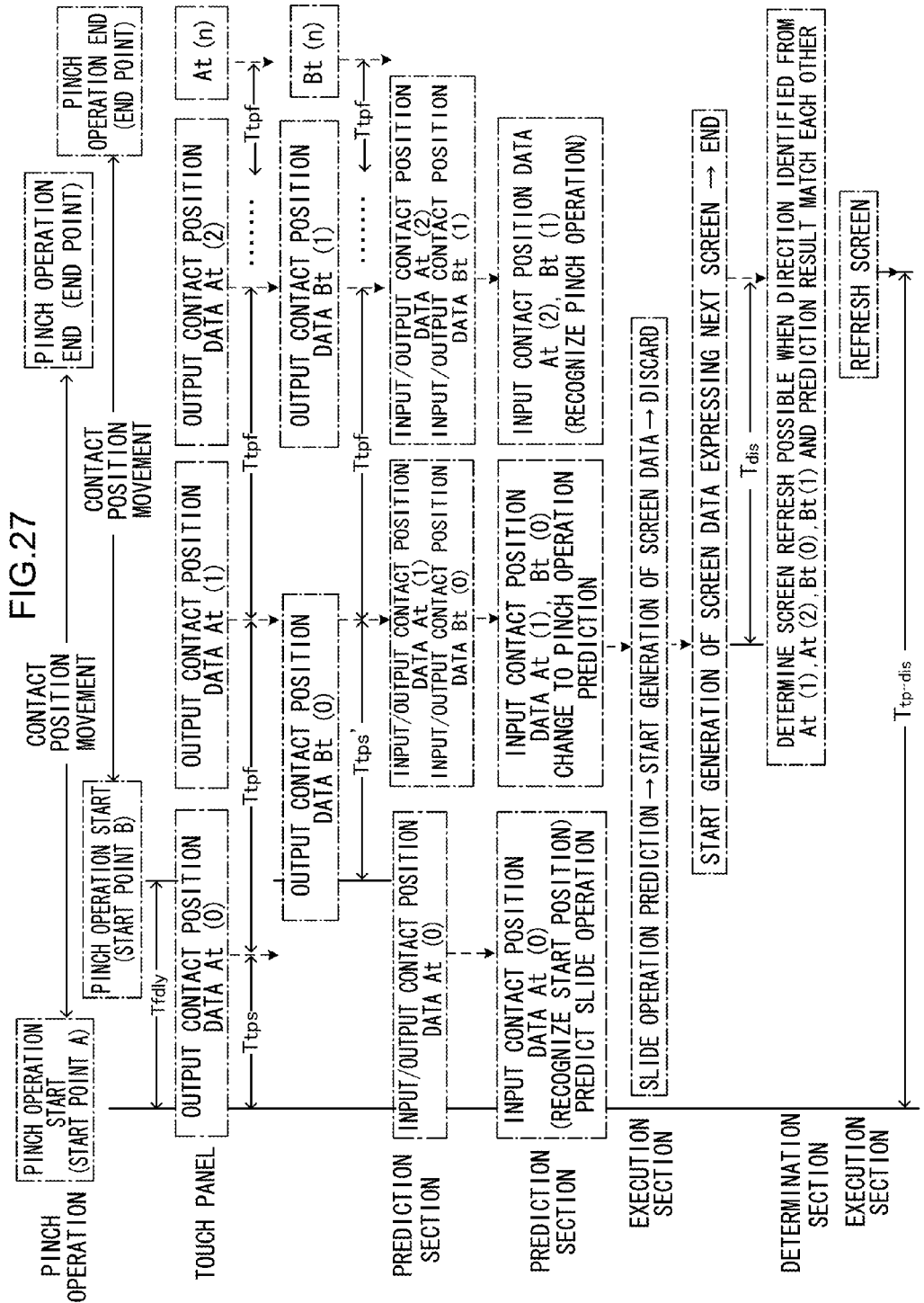

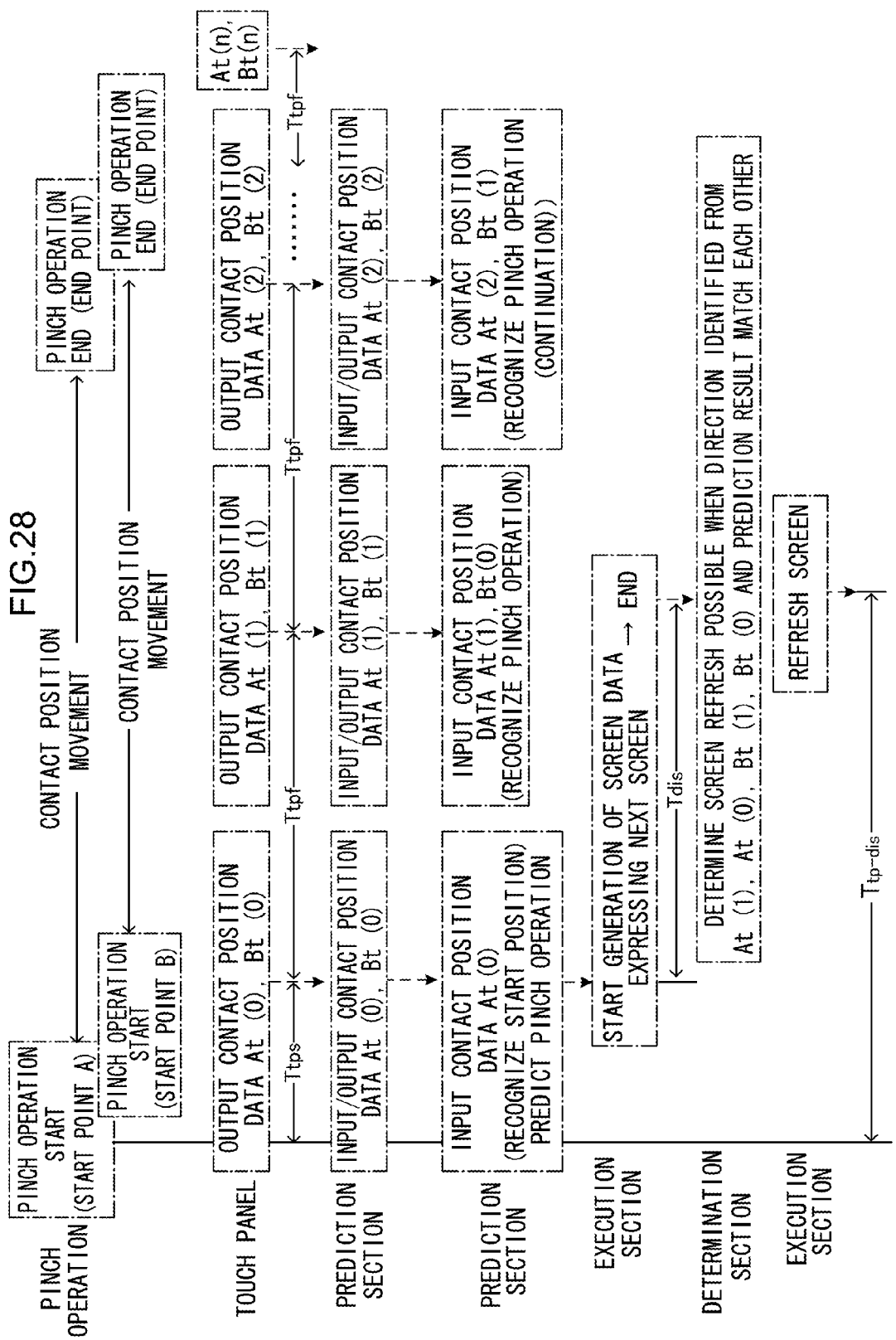

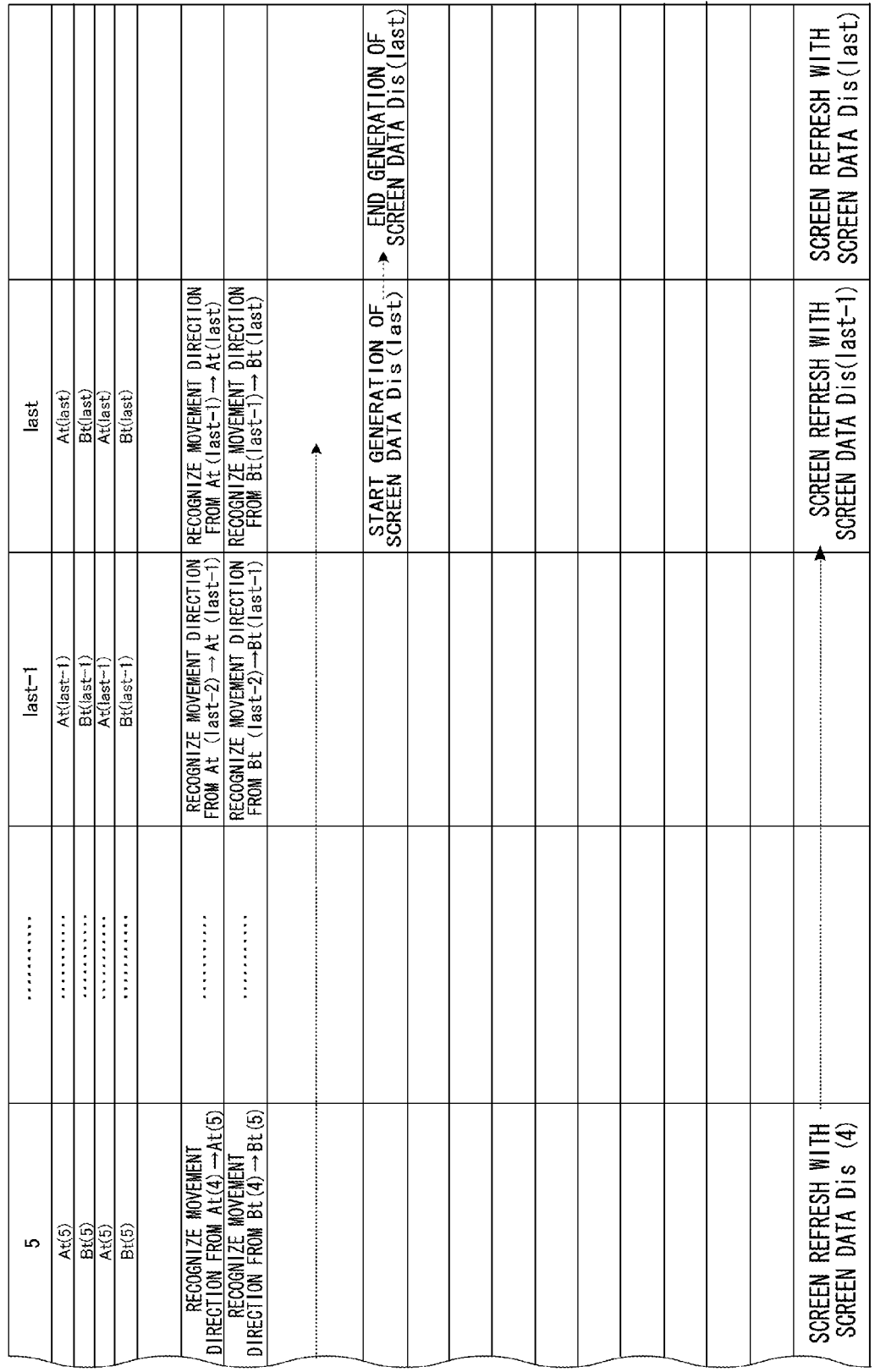

DATA PROCESSING DEVICE AND DATA PROCESSING METHOD

CROSS-REFERENCE TO RELATED APPLICATION

This application is based upon and claims the benefit of priority of the prior Japanese Patent Application No. 2013-005515, filed on Jan. 16, 2013, the entire contents of which are incorporated herein by reference.

FIELD

The embodiments discussed herein are related to a data processing device and a data processing method.

BACKGROUND

Known data processing devices provided with a touch panel include for example smartphones, personal computers, Personal Digital Assistants (PDA), and Automated Teller Machines (ATM). In order to recognize a contact operation on the touch panel by a user, such types of data processing device acquire contact position data for the total of all contact positions expressing contact positions of an instructing body that instructs the touch panel on the touch panel (for example the finger of the user). Accordingly, the greater the amount of contact position data acquired, the longer a standby duration from the start of contact operation of the touch panel until processing according to the contact operation is executed.

As technology that enables recognition of contact operation of the touch panel without acquiring contact position data for plural contact positions, technology is known in which an approach sensor is installed in the data processing device, and contact operation is recognized employing the approach sensor and the touch panel.

[Related Patent Documents] Japanese Laid-Open Patent Publication No. 2011-170834.

SUMMARY

According to an aspect of the embodiments, a data processing device that includes: a processor; and a memory storing instructions, which when executed by the processor perform a procedure. The procedure includes: (a) detecting contact to an operation face and outputting contact position data expressing a contact position on the operation face; (b) predicting a contact operation based on a number of the contact positions identified from the contact position data output at (a) prior to the contact operation to the operation face being identified from a time series of the contact positions expressed by the contact position data output at (a); and (c) executing processing according to the contact operation predicted at (b).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 27 is a sequence diagram illustrating an example of a flow of processing performed by a computer and a touch panel according to a pinch operation performed on the touch panel provided to a smartphone according to an exemplary embodiment in a case in which 2 instructing bodies do not make contact at the same time in the pinch operation;

FIG. 28 is a sequence diagram illustrating an example of a flow of processing performed by a computer and a touch panel according to a pinch operation performed on the touch panel provided to a smartphone according to an exemplary embodiment in a case in which 2 instructing bodies make contact at the same time in a pinch operation;

FIG. 30B is a continuation of the sequence diagram illustrated in FIG. 30A;

DESCRIPTION OF EMBODIMENTS

COMPARATIVE EXAMPLE

Figure 32:
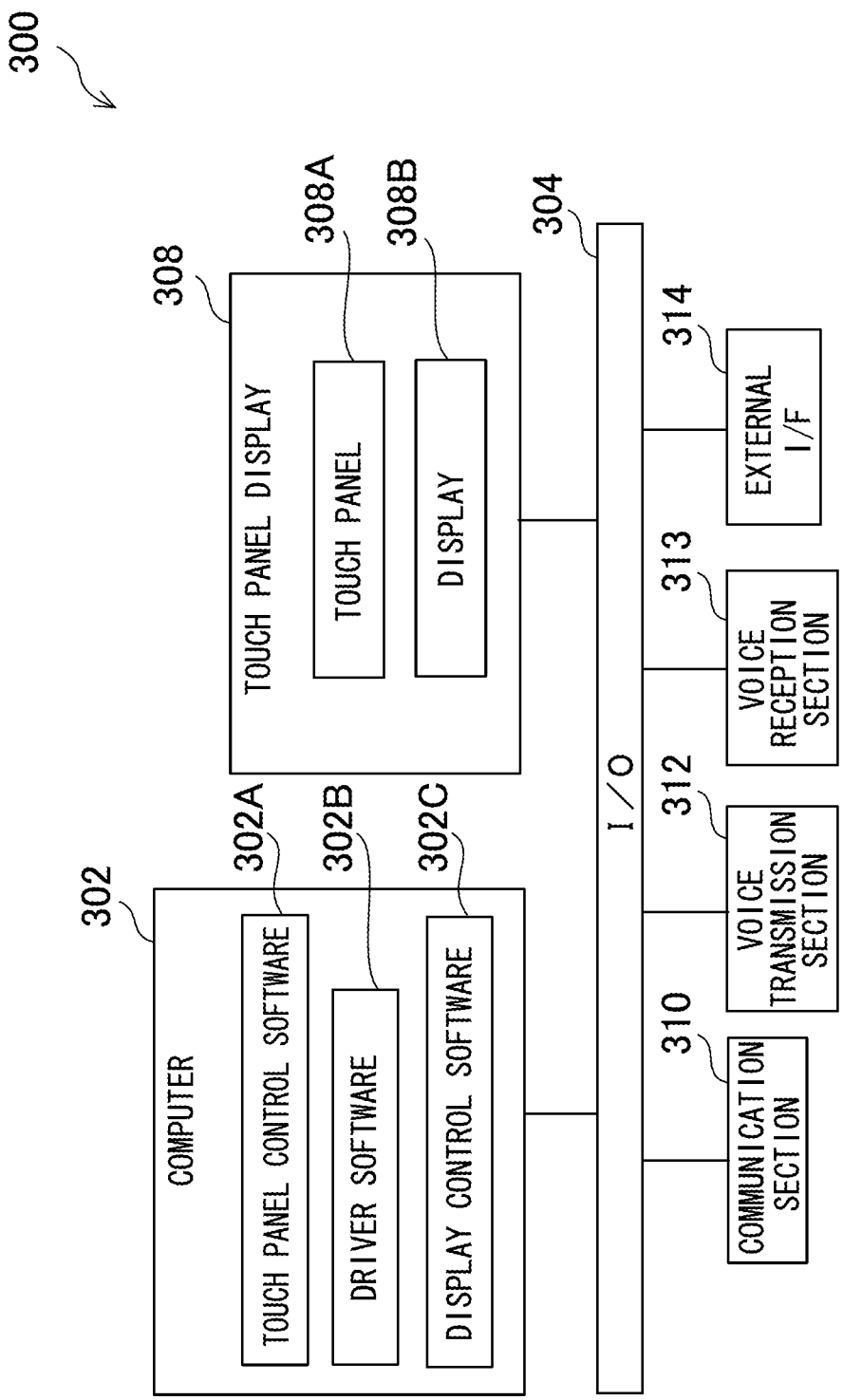
FIG. 32 is a block diagram illustrating an example of configuration of an electrical system in a related smartphone.

Before proceeding to explanation regarding an exemplary embodiment of the technology disclosed herein, explanation will be given regarding a Comparative Example of technology disclosed herein. FIG. 32 illustrates an example of configuration of a smartphone 300 according to the Comparative Example. As illustrated in FIG. 32, the smartphone 300 includes a computer 302 and various input/output devices. The computer 302 includes a Central Processing Unit (CPU), volatile memory (for example Random Access Memory (RAM)), and a non-volatile storage section (for example a Hard Disk Drive (HDD) or flash memory).

The smartphone 300 is provided with an input/output interface (I/O) 304 that electrically connects the computer 302 and the various input/output devices and controls the sending and receiving of various data between the computer 302 and the various input/output devices. In the smartphone 300 the computer 302 is connected to the I/O 304, and the smartphone 300 is also provided with a touch panel display 308 serving as an input/output device that is electrically connected to the computer 302 due to being connected to the I/O 304.

The touch panel display 308 includes a transparent touch panel 308A that is an example of a detection section of the technology disclosed herein, and a display 308B (for example a liquid crystal display) that is an example of a display section of the technology disclosed herein. The touch panel 308A is superimposed on the display 308B.

The touch panel 308A detects contact by an instructing body (for example a finger of a user of the smartphone 300), and accepts instructions by outputting contact position data (for example 2 dimensional coordinates) indicating a contact position of the instructing body on the touch panel 308A. The display 308B displays various information.

The smartphone 300 is provided with a communication section 310, a voice transmission section 312, a voice reception section 313 and an external interface (I/F) 314 serving as input/output devices connected to the I/O 304.

The communication section 310 controls transmission and reception of various data between a data processing device (not illustrated in the drawings) connected to a wireless communication network and the computer 302 by performing wireless communication between the communication section 310 and the nearest base station of the wireless communication network. The communication section 310 is configured including for example an antenna (not illustrated in the drawings) and a Radio Frequency (RF) circuit (not illustrated in the drawings). When thus configured, the communication section 310 for example receives signals wirelessly transmitted from an external data processing device via a base station with the antenna, performs demodulation processing on the received signal in the RF circuit, and supplies data containing the received signal to the computer 302. The communication section 310 also performs modulation processing on data supplied from the computer 302, and transmits the data through the antenna to an external data processing device via a base station.

The voice transmission section 312 detects a voice generated by the user of the smartphone 300 during a phone call, and outputs voice signals expressing the detected voice to the computer 302. The voice transmission section 312 includes for example a microphone (not illustrated in the drawings) and a signal processing circuit (not illustrated in the drawings). When thus configured, the microphone detects the voice, and the voice detected by the microphone is converted into voice data in the signal processing circuit and output to the communication section 310 through the computer 302. Note that an example is given of a configuration wherein the voice data is output to the communication section 310 through the computer 302, however the voice data may be directly output to the communication section 310 from the signal processing device included in the voice transmission section 312.

The voice reception section 313 outputs a voice expressed by voice data received by the communication section 310. The voice reception section 313 includes for example a digital to analogue (D/A) conversion circuit (not illustrated in the drawings), an amplifier (not illustrated in the drawings), and a speaker (not illustrated in the drawings). When thus configured, for example the D/A conversion circuit performs D/A conversion on voice data supplied from the computer 302, and after D/A conversion, a voice signal is amplified by the amplifier and output to the speaker. The speaker externally outputs a voice according to the voice signal input from the amplifier. Note that an example is given of configuration wherein the voice data received by the communication section 310 is supplied to the voice reception section 313 through the computer 302, however the voice data received by the communication section 310 may be directly supplied to the voice reception section 313 without going through the computer 302.

The external I/F 314 connects to an external device (for example a personal computer or to USB memory), and controls the transmission and reception of various data between the external device and the computer 302.

The computer 302 includes touch panel control software 302A, driver software 302B, and display control software 302C. The touch panel control software 302A is software for controlling the touch panel 308A. The driver software 302B is software that provides a common interface for an Operating System (OS) installed on the smartphone 300 and the touch panel control software 302A. The display control software 302C is software for controlling the display 308B. Note that in the following explanation, the touch panel control software 302A, the driver software 302B and the display control software 302C are referred to as touch panel display software when there is no need to differentiate between them.

Incidentally, the display 308B displays various screens by execution of the display control software 302C by the computer 302. Out of the various screens displayed by the display 308B, the designated screen mode state (examples thereof include screens capable of slide display (scrollable screens), enlargeable screens and reducible screens) are changed by operation of the smartphone 300. Namely, the designated screen modes are changed according to contact operation of the touch panel 308A by the instructing body by execution of the touch panel display software by the computer 302.

For example, when a screen that is capable of slide display is displayed on the display 308B, the screen slides according to slide operation performed on the touch panel 308A. Slide operation means, for example, a contact operation wherein a single instructing body contacts the touch panel 308A and the contact position is moved in a straight line whilst maintaining a contact state.

When an enlargeable and reducible screen is displayed on the display 308B, the screen is enlarged according to pinch-out operation performed on the touch to the touch panel 308A, and the screen is reduced according to pinch-in operation performed on the touch to the touch panel 308A. Pinch-out operation refers for example to a contact operation wherein 2 instructing bodies contact the touch panel 308A, and the 2 contact positions are moved in a direction so as to increase the distance between them whilst maintaining a contact state. Pinch-in operation means, for example, contact operation wherein 2 instructing bodies contact the touch panel 308A, and the 2 contact positions are moved in a direction so as to decrease the distance between them whilst maintaining a contact state. Note that in the following explanation, pinch-out operation and pinch-in operation are referred to as "pinch operation" when there is no need to differentiate between the two.

Figure 33:
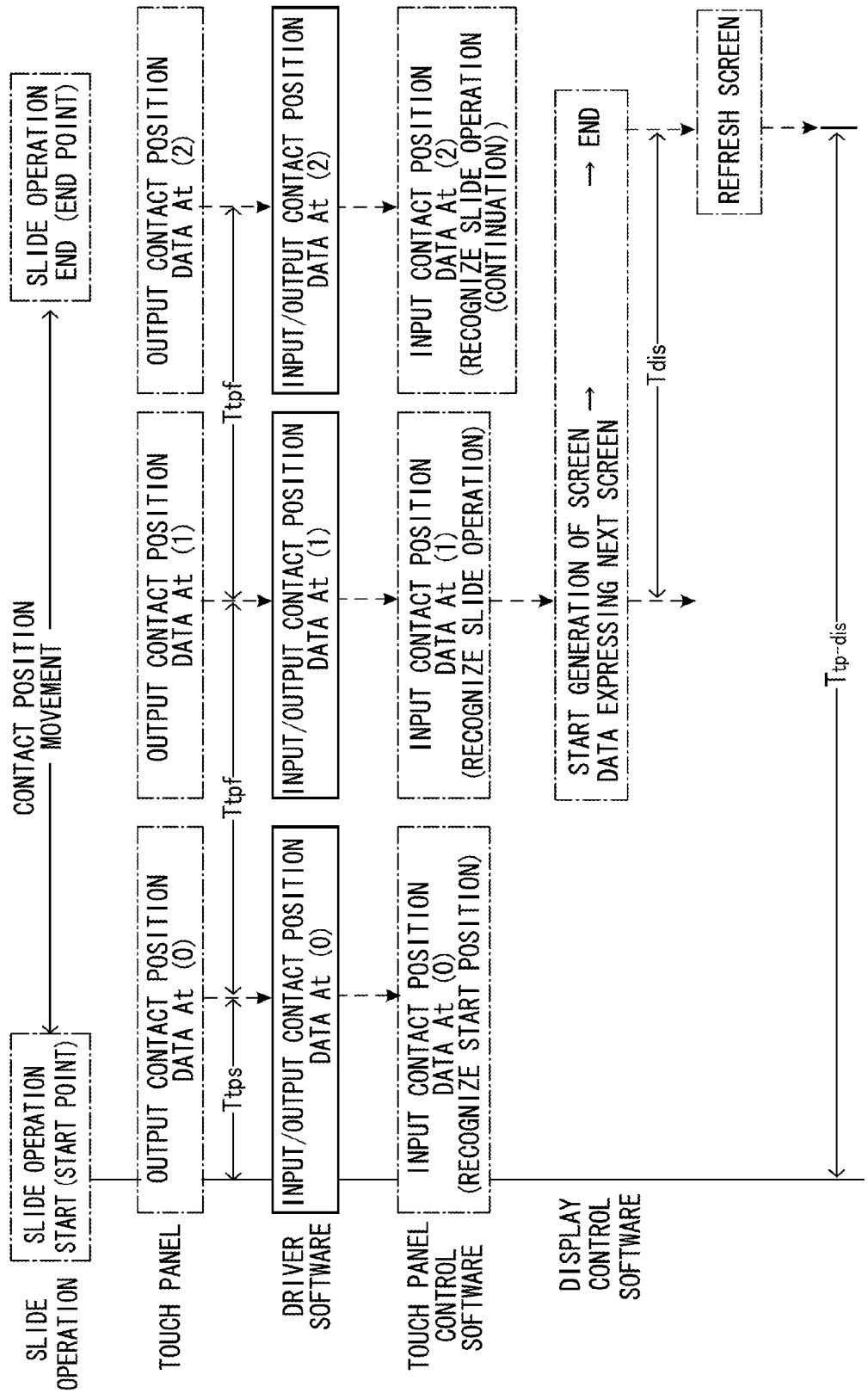
FIG. 33 is a sequence diagram illustrating an example of a flow of processing performed by a computer and a touch panel according to a slide operation performed on the touch panel that is provided to a related smartphone.

Explanation follows regarding processing performed by the computer 302 and the touch panel 308A according to slide operation performed on the touch panel 308A, with reference to FIG. 33.

FIG. 33 is a sequence diagram illustrating an example of a flow of processing performed by the computer 302 and the touch panel 308A according to slide operation performed on the touch panel 308A. Note that in the example illustrated in FIG. 33, the processing performed by the computer 302 is illustrated by functions realized by execution of the touch panel control software 302A, the driver software 302B, and the display control software 302C by the computer 302.

As illustrated in FIG. 33, at the start of contact to the touch panel 308A by the instructing body, the touch panel 308A detects contact of the instructing body, and outputs contact position data At (0) to the driver software 302B after a duration Ttps (for example every 10 ms). The touch panel control software 302A acquires the contact position data At (0) from the touch panel 308A through the driver software 302B.

When the touch panel 308A has output the contact position data At (0), the touch panel 308A outputs contact position data At (n) to the driver software 302B at every duration Ttpf (for example every 20 ms) until the contact state of the instructing body is released. The touch panel control software 302A acquires the contact position data At (n) (in the example illustrated in FIG. 33, At (1), At (2)) through the driver software 302B each time contact to the instructing body is detected and the contact position data At (n) is output by the touch panel 308A.

The touch panel control software 302A recognizes that the contact operation of the touch panel 308A by the instructing body is a slide operation by acquiring the contact position data At (0) followed by the contact position data At (1). When the touch panel control software 302A has recognized a slide operation, the touch panel control software 302A starts generation of screen data expressing the next screen for display on the display 308B (referred to below as "screen data"). Generation of the screen data is completed when the contact position data At (2) is acquired. Then, the display control software 302C performs control so as to display on the display 308B the screen expressed by the screen data generated by the touch panel control software 302A.

A duration $T_{tp\text{-}dis}$ illustrated in FIG. 33 is the required duration from the start of slide operation of the touch panel 308A until control of the display 308B is performed by the display control software 302C. The duration $T_{tp\text{-}dis}$ is expressed by Formula (1) below. In Formula (1), the duration Ttps is the required duration from the start of contact to the touch panel 308A by the instructing body until the contact position data At (0) is output. A duration Tdis is the required duration from the start of generation of the screen data by the touch panel control software 302A until the display control software 302C performs control to display on the display 308B the screen expressed by the screen data.

$$\text{Duration} T_{tp\text{-}dis} = T\text{tps} + T\text{tpf} + T\text{dis} \qquad (1)$$

Figure 34:
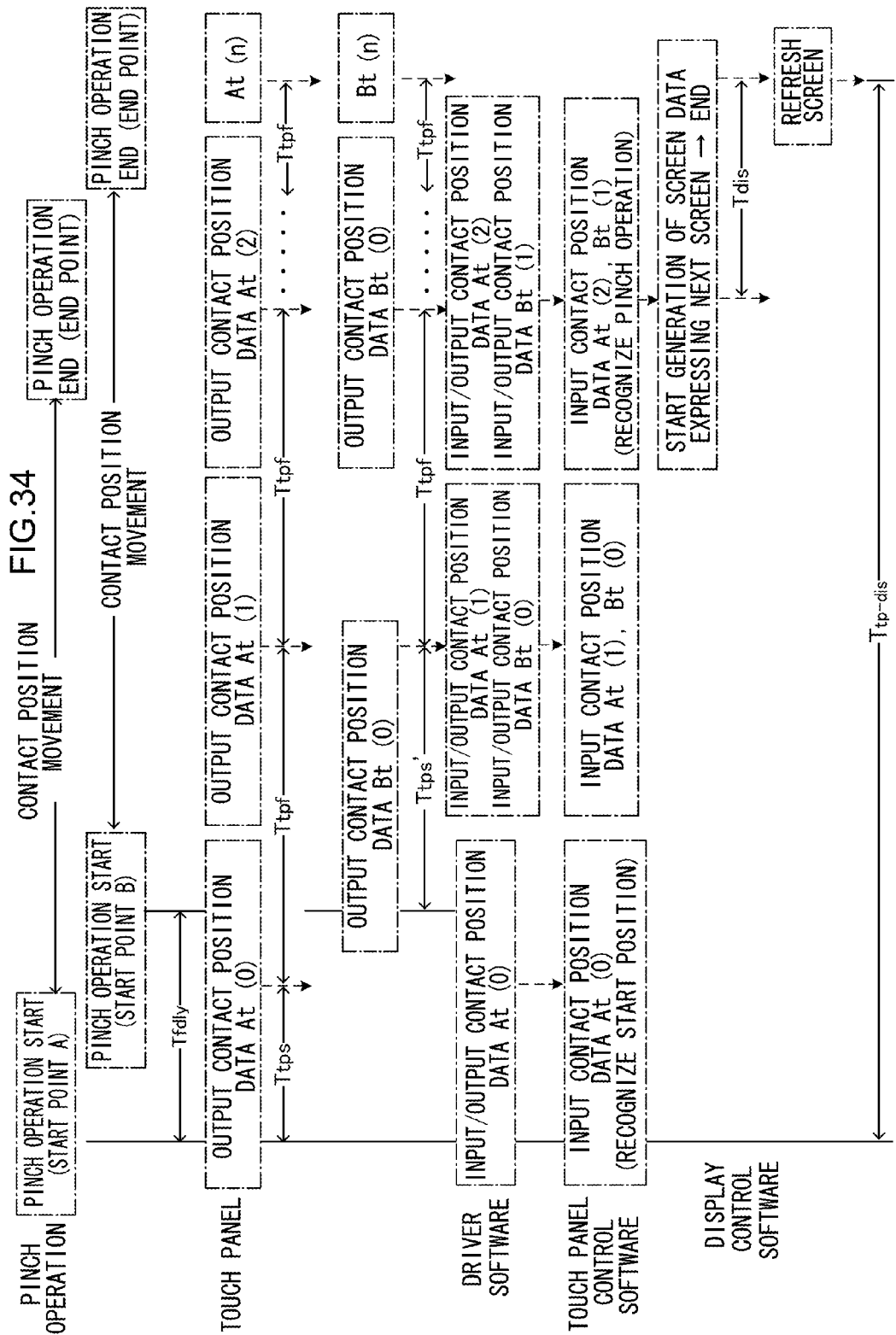
FIG. 34 is a sequence diagram illustrating an example of a flow of processing performed by a computer and a touch panel according to a pinch operation performed on the touch panel that is provided to a related smartphone.

Explanation follows regarding processing performed by the computer 302 and the touch panel 308A according to pinch operation performed on the touch panel 308A, with reference to FIG. 34. Note that for ease of explanation, a case is described wherein the start of contact to the touch panel 308A by one out of 2 instructing bodies is followed by the start of contact to the touch panel 308A by the other of the instructing bodies after a delay of duration Tfdly.

FIG. 34 is a sequence diagram illustrating an example of a flow of operation performed by the computer 302 and the touch panel 308A according to pinch operation performed on the touch panel 308A. Note that similarly to in FIG. 33, in the example illustrated in FIG. 34, the processing performed by the computer 302 is illustrated by functions realized by execution of the touch panel control software 302A, the driver software 302B, and the display control software 302C by the computer 302.

As illustrated in FIG. 34, at the start of contact to the touch panel 308A by the one instructing body, the touch panel 308A detects the contact of the instructing body, and outputs contact position data At (0) to the driver software 302B after the duration Ttps. The touch panel control software 302A acquires the contact position data At (0) from the touch panel 308A through the driver software 302B. When the touch panel 308A has output the contact position data At (0), the touch panel 308A outputs contact position data At (n) to the driver software 302B at every duration Ttpf until the contact state of the instructing body is released. The touch panel control software 302A acquires the contact position data At (n) through the driver software 302B each time contact of the instructing body is detected and the contact position data At (n) is output by the touch panel 308A.

At the start of contact to the touch panel 308A by the other instructing body, the touch panel 308A outputs contact position data Bt (0) to the driver software 302B after a specific timing from the detection of instructing body contact. The specific timing means, for example, to a point in time the duration Ttpf after the touch panel 308A has output the contact position data At (0) (in the example illustrated in FIG. 34, a point in time a duration Ttps' after the detection of instructing body contact). The touch panel control software 302A acquires the contact position data Bt (0) from the touch panel 308A through the driver software 302B. When the touch panel 308A has output the contact position data Bt (0), the touch panel 308A outputs contact position data Bt (n) to the driver software 302B at every duration Ttpf until the contact state of the instructing body is released. The touch panel control software 302A acquires the contact position data Bt (n) through the driver software 302B every time contact of the instructing body is detected and the contact position data Bt (n) is output by the touch panel 308A.

The touch panel control software 302A recognizes that the contact operation of the touch panel 308A by the instructing bodies is a pinch operation by acquiring the contact position data At (0), At (1), At (2), Bt (0), Bt (1). Namely, the touch panel control software 302A recognizes that a contact operation is a pinch operation by acquiring the contact position data At (0), followed by the contact position data At (1) and Bt (0), and then acquires the contact position data At (2) and Bt (1). When the touch panel control software 302A has recognized a pinch operation, the touch panel control software 302A starts generation of screen data, and completes generation of the screen data when the contact position data At (3) and Bt (2) are acquired. Then, the display control software 302C performs control so as to display on the display 308B the screen expressed by the screen data generated by the touch panel control software 302A.

The duration $T_{tp\text{-}dis}$ illustrated in FIG. 34 is the required duration from the start of pinch operation of the touch panel 308A until the performance of control of the display 308B by the display control software 302C. The duration $T_{tp\text{-}dis}$ is expressed by Formula (2) below. Note that in Formula (2), the durations Ttps, Ttpf, Tdis are the same as in Formula (1).

$$\text{Duration} T_{tp\text{-}dis} = T\text{tps} + 2T\text{tpf} + T\text{dis} \quad (2)$$

Present Exemplary Embodiment

Detailed explanation follows regarding an example of an exemplary embodiment of technology disclosed herein. Note that in the following explanation, explanation is given wherein a multifunction mobile telephone device, namely what is known as a smartphone, is given as an example of the data processing device of technology disclosed herein, however there is no limitation thereto. The technology disclosed herein may, for example, be applied to various data processing devices such as a portable personal computer or PDA, a desktop type personal computer, or an ATM. Note that in the present exemplary embodiment, configuration elements similar to configuration elements of the Comparative Example described above are allocated the same reference numerals, and explanation thereof is omitted.

A smartphone 10 includes a detection section 12, a prediction section 14, an execution section 16, and a display section 18. The detection section 12 detects contact to an operation face and outputs contact position data expressing a contact position on the operation face. Here, "operation face" means a touch panel display provided to the smartphone 10.

The prediction section 14 predicts a contact operation based on a number of contact positions identified from the contact position data output from the detection section 12 prior to a contact operation to the operation face being identified from a time series of contact positions expressed by the contact position data output from the detection section 12. The number of contact positions identified from the contact position data prior to a contact operation to the operation face being identified means, for example, the number of contact position start positions (for example positions of contact positions at contact start), and corresponds to the number of instructing bodies contacting the operation face. Namely, for example when 1 finger, serving as an instructing body, contacts the operation face, the number of contact positions prior to the contact operation to the operation face being identified is "1". When 2 fingers serving as instructing bodies contact the operation face, the number of contact positions prior to the contact operation to the operation face being identified is "2". Note that in the present exemplary embodiment, for ease of explanation, explanation is given using slide operation and pinch operation as examples of contact operations.

The execution section 16 executes processing according to the contact operation predicted by the prediction section 14. Here, "processing according to the contact operation" means, for example, processing to move the screen being displayed by the touch panel display provided to the smartphone 10 according to the contact operation.

When the number of contact positions is 1, the prediction section 14 predicts that the contact operation is a slide operation. When there are a plural number of contact positions, the prediction section 14 predicts that the contact operation is a pinch operation, this being an example of a enlarging or reducing operation in which the distance between at least 2 of the contact positions on the operation face is enlarged or reduced. Note that "at least 2 of the contact positions" means, for example, the positions where 2 or more instructing bodies (such as 2 or more fingers) have contacted the operation face. Note that in order to avoid confusion, in the present exemplary embodiment an example is given wherein two instructing bodies contact the operation face (in which there is a pair of contact positions).

When the number of contact positions increases after the prediction section 14 has predicted that a contact operation is a slide operation, but prior to the contact operation to the operation face being identified as a slide operation, the predicted contact operation is changed from a slide operation to a pinch operation.

When the prediction section 14 has predicted that a contact operation is a slide operation, the prediction section 14 also predicts a contact position slide direction of the slide operation from a positional relationship between the contact position and a preset reference line (referred to simply as "reference line" below) with respect to the operation face. Note that an example is given wherein for example a slide direction is predicted employing the reference line when the screen being displayed on the touch panel display is capable of slide display in at least one out of a horizontal direction and a vertical direction as viewed from the front.

When the prediction section 14 has predicted that a contact operation is a slide operation, the prediction section 14 moreover predicts a contact position slide direction of the slide operation from a positional relationship between the contact position and a preset reference point (referred to simply as "reference point" below) with respect to the operation face. Note that an example is given wherein a slide direction is predicted employing the reference point when a screen that is capable of slide display in at least one out of a horizontal direction and a vertical direction as viewed from the front is being displayed on the touch panel display. Moreover, an example is also given for when a screen that is capable of slide display in every direction around 360 degrees about the operation face is being displayed.

When the prediction section 14 has predicted that a contact operation is a pinch operation, and the distance between the pair of contact positions is a threshold value or below, the prediction section 14 predicts that an enlarging or reducing operation is a pinch-out operation that is an example of an enlarging operation wherein the distance between the pair of contact positions is enlarged. When the prediction section 14 has predicted that a contact operation is pinch operation, and the distance between the pair of contact positions is greater than the threshold value, the prediction section 14 predicts that an enlarging or reducing operation is a pinch-in operation, that is an example of a reducing operation wherein the distance between the pair of contact positions is reduced.

The smartphone 10 includes a reference line reset section 18, a reference point reset section 20 and a refresh section 22. The reference line reset section 18 resets the reference line on the operation face so as to position the reference line between the start position and the end position of a contact position in a slide operation performed in the past. The reference point reset section 20 resets the reference point on the operation face so as to position the reference point between the start position and the end position of a contact position in a slide operation performed in the past. Note that the "end position" means, for example, the contact position at the point in time that contact ended. An example is given where "between the start position and the end position" is for example the central position between the start position and the end position, however there is no limitation of the technology disclosed herein thereto. For example, configuration may be made with a position that is a specific distance (for example a distance set by a user) towards the start position side from the central position, or a position a specific distance towards the end position side from the central position. "A slide operation performed in the past" means, for example, the most recently performed past slide operation, however there is no limitation thereto and may for example be a single slide operation performed within a specific period of time in the past.

The refresh section 22 refreshes the threshold value, described above, that is employed during prediction by the prediction section 14 as to whether a pinch operation is a pinch-out operation or a pinch-in operation. Namely, the threshold value is refreshed to a value that corresponds to between the distance between a pair of contact positions at the time of contact start and the distance between the pair of contact positions at the time of contact end in a pinch operation performed in the past.

The smartphone 10 includes a display section 24. The display section 24 displays a screen. The execution section 16 causes a screen according to a contact operation predicted by the prediction section 14 to be displayed on the display section 24. Note that an example is given wherein the display section 24 is a display included in the touch panel display provided to the smartphone 10.

The smartphone 10 includes a determination section 26. The determination section 26 determines whether or not a contact operation predicted by the prediction section 14 is correct. Namely, the determination section 26 determines whether or not a prediction result of the prediction section 14 is correct based on comparison with a contact operation identified from a time series of contact positions expressed by the contact position data output from the detection section 12. When the determination section 26 has determined that the prediction result of the prediction section 14 is correct, the execution section 16 causes a screen to be displayed on the display section 24.

Figure 2:
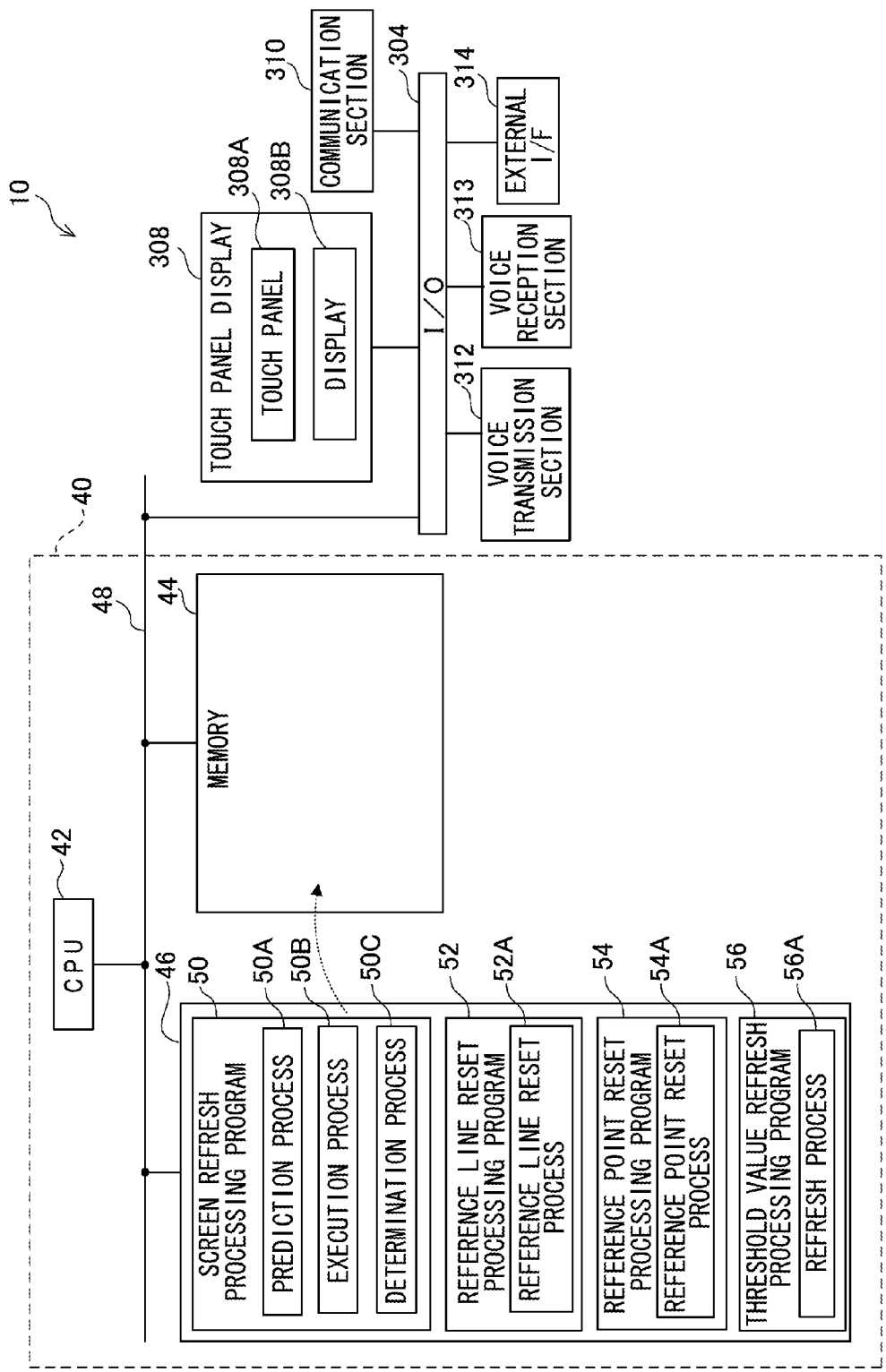
FIG. 2 is a block diagram illustrating an example of configuration of an electrical system of a smartphone according to an exemplary embodiment.

FIG. 2 illustrates an example of relevant portions of an electrical system of the smartphone 10. As illustrated in FIG. 2, the smartphone 10 differs from the smartphone 300 (see FIG. 32) of the Comparative Example in the respect that the smartphone 10 includes a computer 40 in place of the computer 302 of the smartphone 300. The prediction section 14, the execution section 16, the reference line reset section 18, the reference point reset section 20, the refresh section 22 and the determination section 26 may for example be implemented by the computer 40 and various input/output devices.

The computer 40 includes a Central Processing Unit (CPU) 42, memory 44, and a non-volatile storage section 46. The CPU 42, the memory 44 and the storage section 46 are mutually connected together through a bus 48. The bus 48 is connected to the I/O 304. Note that the storage section 46 may be implemented by for example a Hard Disk Drive (HDD) or flash memory.

The storage section 46 is stored with a screen refresh processing program 50, a reference line reset processing program 52, a reference point reset processing program 54, and a threshold value refresh processing program 56 (referred to below as "programs" when it is not necessary to differentiate therebetween). The CPU 42 reads the screen refresh processing program 50 from the storage section 46 and expands it into the memory 44, and sequentially executes the processes of the screen refresh processing program 50. The screen refresh processing program 50 includes a prediction process 50A, an execution process 50B and a determination process 50C. The CPU 42 operates as the prediction section 14 illustrated in FIG. 1 by executing the prediction process 50A. The CPU 42 operates as the execution section 16 illustrated in FIG. 1 by executing the execution process 50B. The CPU 42 moreover operates as the determination section 26 illustrated in FIG. 1 by executing the determination process 50C.

The CPU 42 reads the reference line reset processing program 52 from the storage section 46 and expands it into the memory 44, and executes the process of the reference line reset processing program 52. The reference line reset processing program 52 includes a reference line reset process 52A. The CPU 42 operates as the reference line reset section 18 illustrated in FIG. 1 by executing the reference line reset process 52A.

The CPU 42 reads the reference point reset processing program 54 from the storage section 46 and expands it into the memory 44, and executes the process of the reference point reset processing program 54. The reference point reset processing program 54 operates as the reference point reset section 20 illustrated in FIG. 1 by executing a reference point reset process 54A.

The CPU 42 reads the threshold value refresh processing program 56 from the storage section 46 and expands it into the memory 44, and executes the process of the threshold value refresh processing program 56. The threshold value refresh processing program 56 includes a refresh process 56A. The CPU 42 operates as the refresh section 22 illustrated in FIG. 1 by executing the refresh process 56A.

Note that an example has been given wherein the programs are read from the storage section 46, however there is no requirement to initially store the programs in the storage section 46. For example, the programs may first be stored on an appropriate "portable storage medium" that is used by connecting to the computer 40, such as a Solid State Drive (SSD), a DVD disk, an IC card, a magnetic optical disk or a CD-ROM. Configuration may then be made such that the computer 40 acquires and executes the programs from such portable storage mediums. Configuration may also be made such that the programs are stored in a storage section of another computer or server device that is connected to the computer 40 through a communication circuit, and the computer 40 acquires and executes the programs from the other computer or server device.

Figure 3:
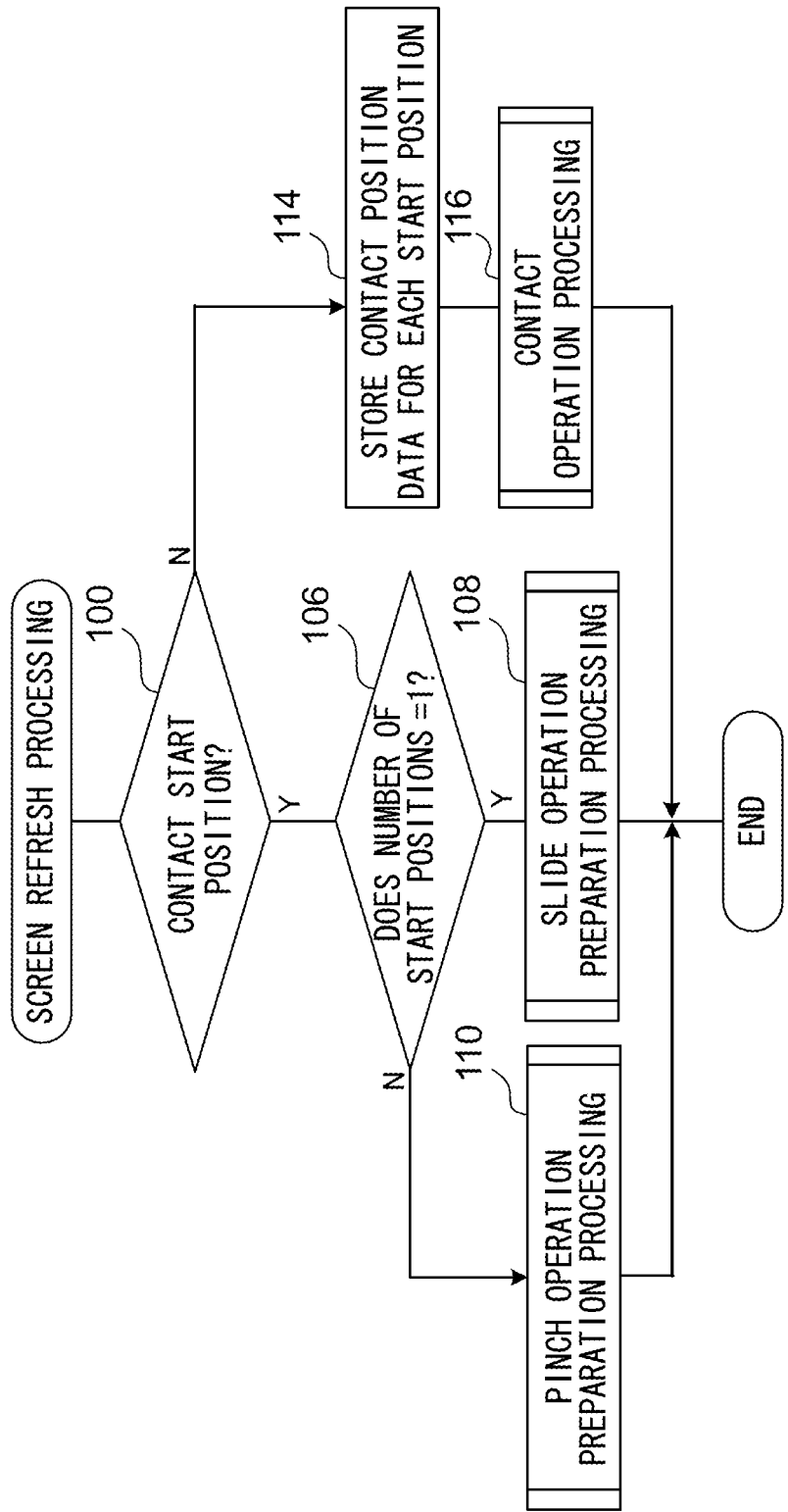
FIG. 3 is a flow chart illustrating an example of a flow of screen refresh processing according to an exemplary embodiment.

Explanation follows regarding screen refresh processing performed by the smartphone 10 as operation of the present exemplary embodiment, with reference to FIG. 3. Screen refresh processing is performed by the CPU 42 executing the screen refresh processing program 50. The smartphone 10 does not perform screen refresh processing when the touch panel 308A has not detected contact, and does perform screen refresh processing when the touch panel 308A has detected contact. Namely, when the touch panel 308A has not detected contact the CPU 42 does not execute the screen refresh processing program 50, and when the touch panel 308A has detected contact, the CPU 42 executes the screen refresh processing program 50 at each specific cycle. Namely, the CPU 42 executes the screen refresh processing program 50 at each specific cycle during a period when an instructing body is contacting the touch panel 308A. The specific cycle is for example the duration Ttpf (see FIG. 33) explained for the Comparative Example as an example of a cycle at which, for example, contact position data is input. Note that for ease of explanation, explanation is given of a case in which a screen that is capable of slide display by slide operation or a screen that is capable of being enlarged or reduced by pinch operation is being displayed on the display 308B of the smartphone 10. Moreover, in order to avoid confusion, explanation is given of a case in which the touch panel 308A has detected contact by either 1 or 2 instructing bodies.

FIG. 3 is a flow chart illustrating an example of a flow of screen refresh processing. In the screen refresh processing illustrated in FIG. 3, first at step 100 the prediction section 14 determines whether or not a contact position expressed by contact position data input from the touch panel 308A is a start position. When at step 100 the contact position expressed by the contact position data input from the touch panel 308A is a start position, determination is affirmative, and processing transitions to step 106.

At step 106, when the current number of start positions is 1, determination is affirmative and processing transitions to step 108. When at step 106 the current number of start positions is not 1 (is 2), determination is negative and processing transitions to step 110.

Figure 4:
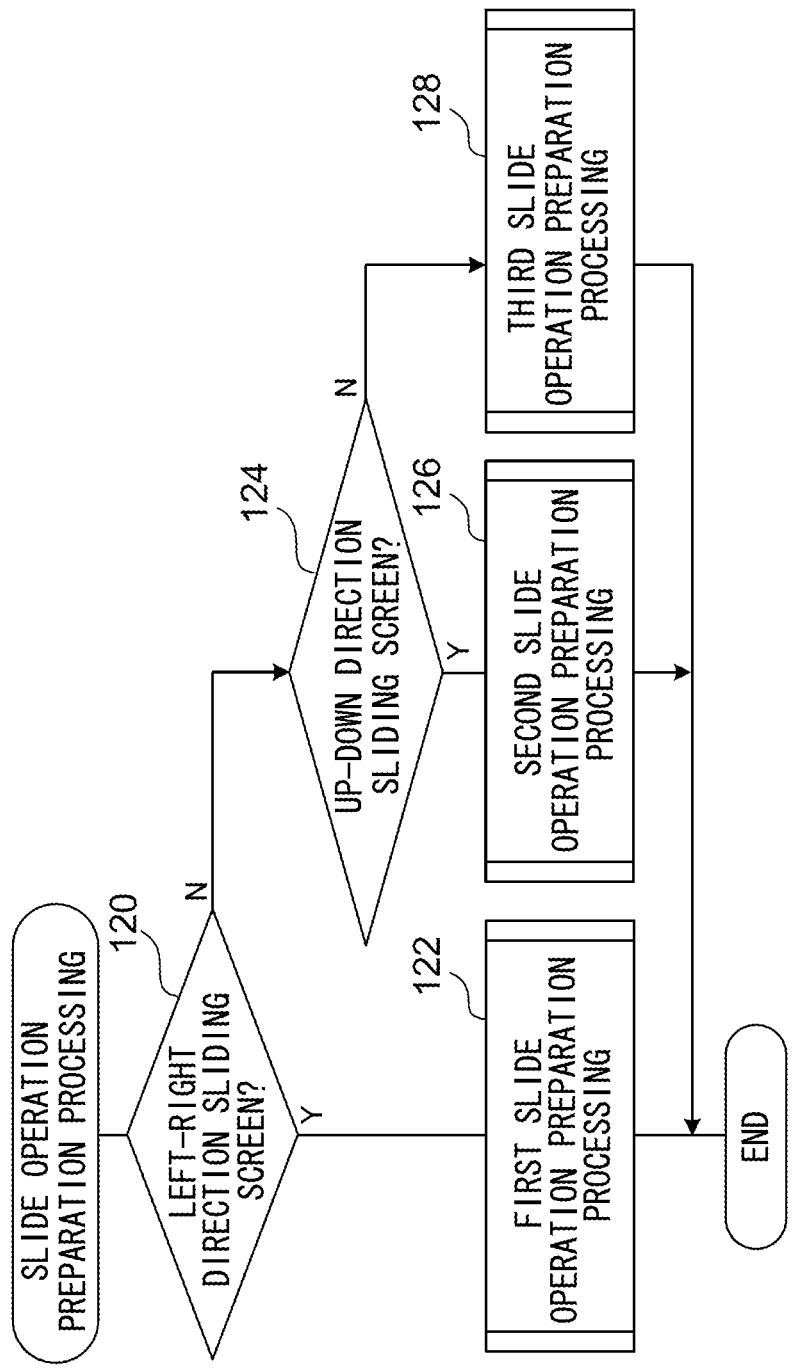
FIG. 4 is a flow chart illustrating an example of a flow of slide operation preparation processing according to an exemplary embodiment.

At step 108, the prediction section 14 performs slide operation preparation processing, an example of which is illustrated in FIG. 4, after step 108, screen refresh processing is ended.

Figure 11:
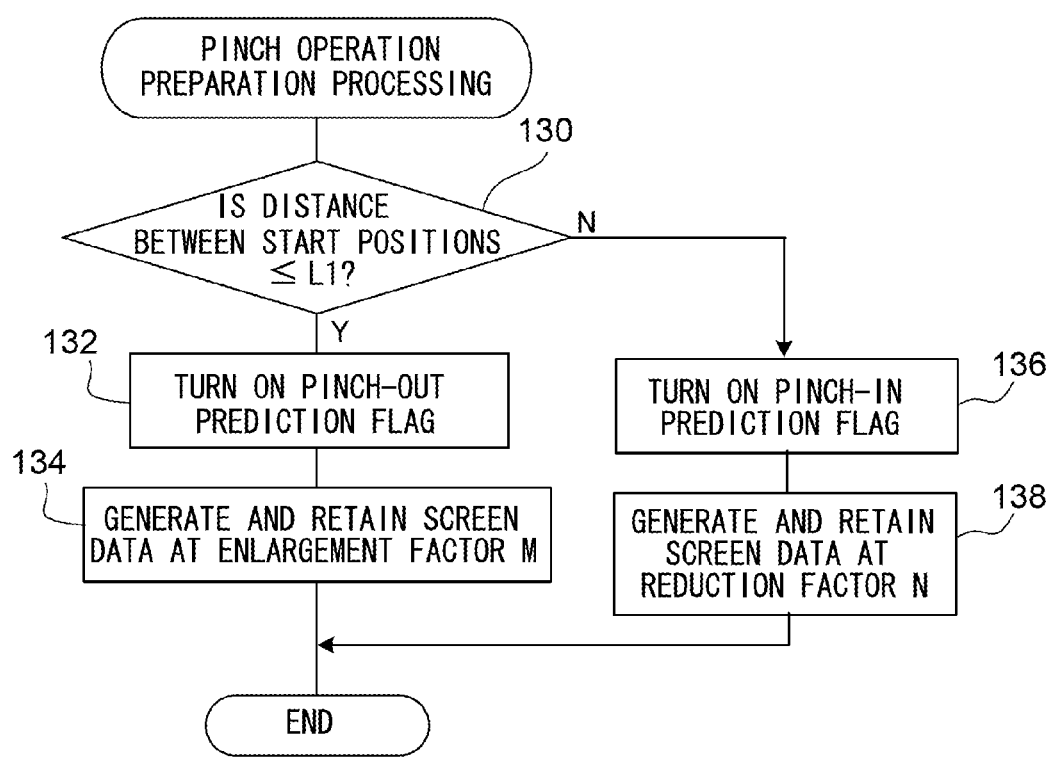
FIG. 11 is a flow chart illustrating an example of a flow of pinch operation preparation processing according to an exemplary embodiment.

At step 110, the prediction section 14 performs pinch operation preparation processing, an example of which is illustrated in FIG. 11, after step 110, screen refresh processing is ended.

Figure 14:
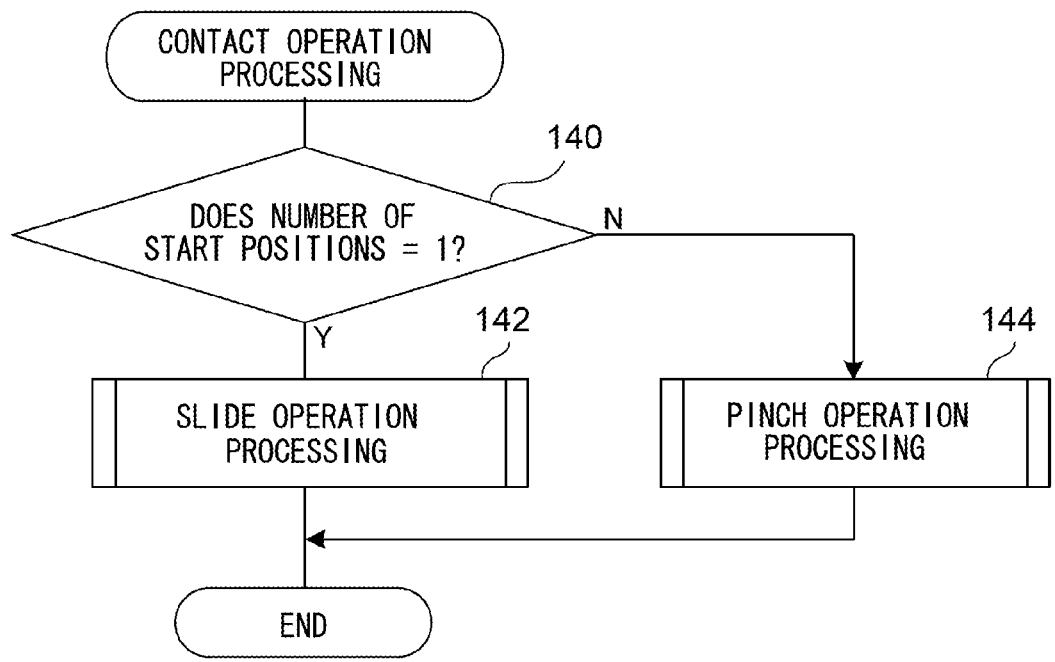
FIG. 14 is a flow chart illustrating an example of a flow of contact operation processing according to an exemplary embodiment.

At step 100, when the contact position expressed by the contact position data input from the touch panel 308A is not a start position, determination is negative and processing transitions to step 114. At step 114 the execution section 16 stores the most recently input contact position data in time series in a specific storage region of the memory 44 for each start position. At the following step 116, the execution section 16 performs contact operation processing, an example of which is illustrated in FIG. 14, after which screen refresh processing is ended.

In the slide operation preparation processing illustrated in FIG. 4, first at step 120 the prediction section 14 determines whether or not the screen that is currently being displayed on the display 308B is a left-right direction sliding screen.

"Left-right direction sliding screen" means a screen that is capable of slide display along the left-right direction (for example in the horizontal direction of the display 308B as viewed from the front). When at step 120 the screen that is currently being displayed on the display 308B is a left-right direction sliding screen, determination is affirmative and processing transitions to step 122. At step 122, the prediction section 14 performs first slide operation preparation processing, an example of which is illustrated in FIG. 5, after step 122, slide operation preparation processing is ended.

Figure 7:
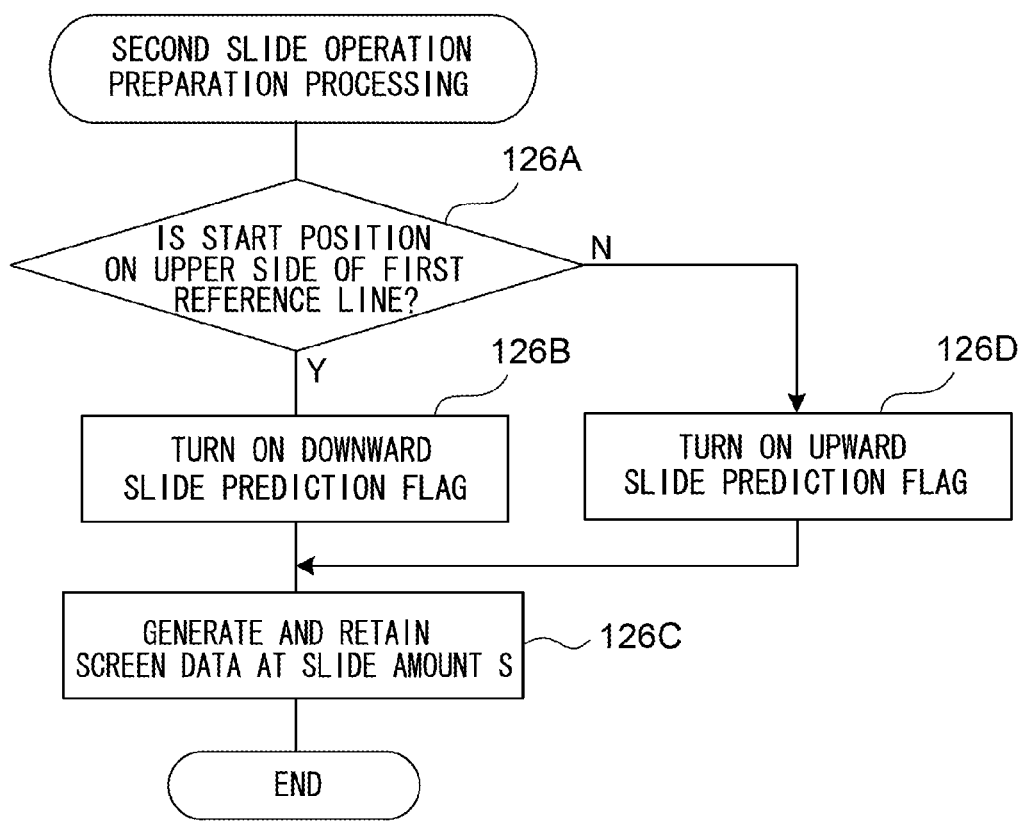
FIG. 7 is a flow chart illustrating an example of a flow of second slide operation preparation processing according to an exemplary embodiment.

When at step 120 the screen is not a left-right direction sliding screen, determination is negative and processing transitions to step 124. At step 124, the prediction section 14 determines whether or not the screen is an up-down direction sliding screen. "Up-down direction sliding screen" means a screen that is capable of slide display in the up-down direction (for example in the vertical direction of the display 308B as viewed from the front). When at step 124 the screen that is currently being displayed on the display 308B is an up-down direction sliding screen, determination is affirmative and processing transitions to step 126. At step 126, the prediction section 14 performs second slide operation preparation processing, an example of which is illustrated in FIG. 7, after step 126, slide operation preparation processing is ended.

Figure 9:
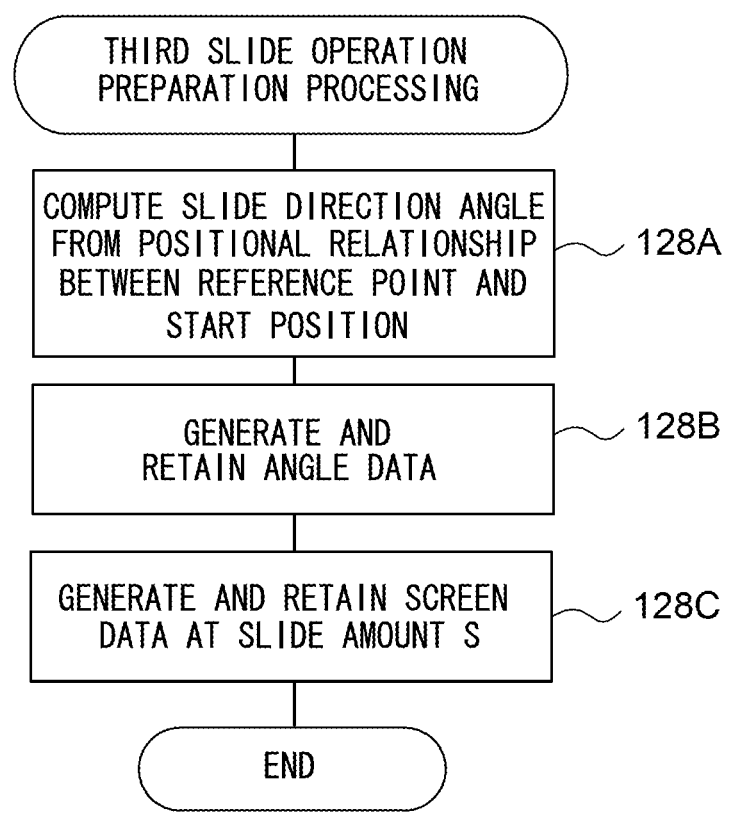
FIG. 9 is a flow chart illustrating an example of a flow of third slide operation preparation processing according to an exemplary embodiment.

When at step 124 the screen is not an up-down direction sliding screen (is an all-direction sliding screen), determination is negative and processing transitions to step 128. "All-direction sliding screen" means a screen capable of slide display in any direction about 360 degrees from the center of the display 308B. At step 128, the prediction section 14 performs third slide operation preparation processing, an example of which is illustrated in FIG. 9, after step 128, slide operation preparation processing is ended.

Figure 5:
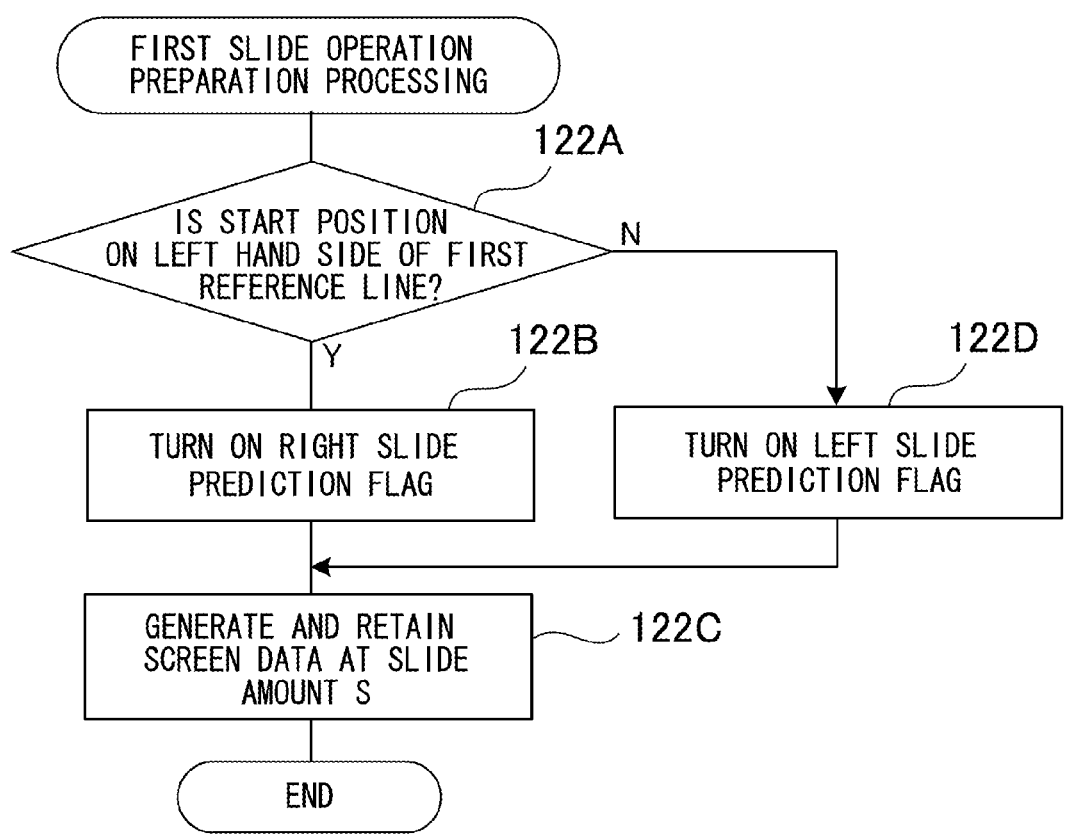
FIG. 5 is a flow chart illustrating an example of a flow of first slide operation preparation processing according to an exemplary embodiment.
Figure 6:
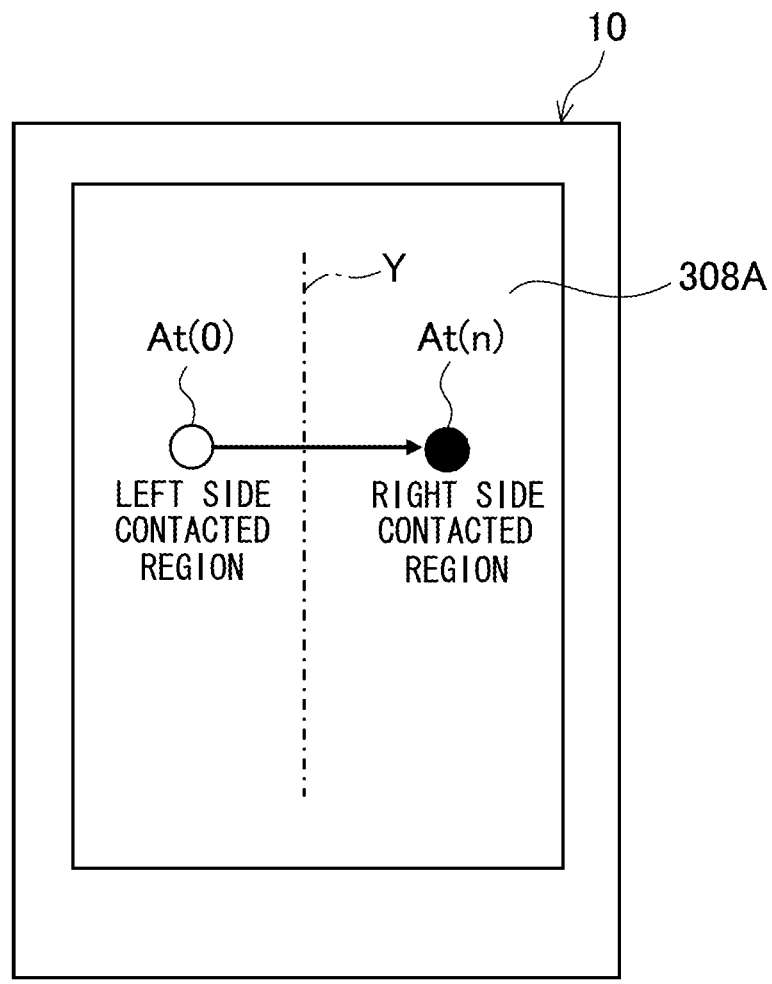
FIG. 6 is a schematic diagram illustrating an example of a reference line set on a touch panel provided to a smartphone according to an exemplary embodiment, the reference line vertically crossing the touch panel.

In the first slide operation preparation processing illustrated in FIG. 5, first at step 122A, the prediction section 14 determines whether or not the start position is on the left side of a first reference line. When at step 122A the start position is on the left side of the first reference line, determination is affirmative and processing transitions to step 122B. As illustrated in for example FIG. 6, the "first reference line" means a straight line Y that crosses the center of the touch panel 308A vertically as viewed from the front. Accordingly, the touch panel 308A is broadly divided into a left side region as viewed from the front (referred to below as the "left side contacted region"), and a right side region as viewed from the front (referred to below as the "right side contacted region"), with the straight line Y forming the boundary between the two. In the example illustrated in FIG. 6, a movement path of the contact position from a start position identified by the contact position data At (0) to an end position identified by the contact position data At (n) is illustrated with the start position present in the left side contacted region. In such a case, determination is affirmative at step 122A. However, when the start position is present in the right side contacted region, determination is negative at step 122A.

At step 122B, the prediction section 14 turns ON a right slide prediction flag that expresses a prediction of a right direction slide operation, after step 122B, processing transitions to step 122C. Note that a "right direction slide operation" means an operation in which a contact position is moved from the left side contacted region to the right side contacted region illustrated for example in FIG. 6 in the direction of the straight line illustrated in FIG. 6.

At step 122A, when the contact position is not present on the left side of the first reference line (when the contact position is on the right side (including when the contact position is over the first reference line)), determination is negative and processing transitions to step 122D. At step 122D, the prediction section 14 turns ON a left slide prediction flag expressing a prediction of a left direction slide operation, after step 122D, processing transitions to step 122C. Note that a "left direction slide operation" means an operation in which a contact position is moved from the right side contacted region to the left side contacted region illustrated for example in FIG. 6 in the opposite direction to the direction of the straight line illustrated in FIG. 6.

At step 122C, the execution section 16 generates and retains screen data expressing a screen in which the screen that is currently being displayed on the display 308B has been slide moved by a slide amount S, after step 122C, the first slide operation preparation processing is ended. Namely at step 122C, when the right slide prediction flag has been turned ON, the execution section 16 generates and retains screen data expressing a screen in which the screen that is currently being displayed on the display 308B has been slide moved towards the right direction by the slide amount S. Moreover, at step 122C, when the left slide prediction flag has been turned ON, the execution section 16 generates and retains screen data expressing a screen in which the screen that is currently being displayed on the display 308B has been slide moved towards the left direction by the slide amount S. Note that "a screen that has been slide moved towards the right direction" means, for example, a screen where a display position of the screen that is currently being displayed on the display 308B has been moved towards the right hand side in FIG. 6. Moreover, "a screen that has been slide moved towards the left direction" means, for example, a screen where a display position of the screen that is currently being displayed on the display 308B has been moved towards the left hand side in FIG. 6.

Figure 8:
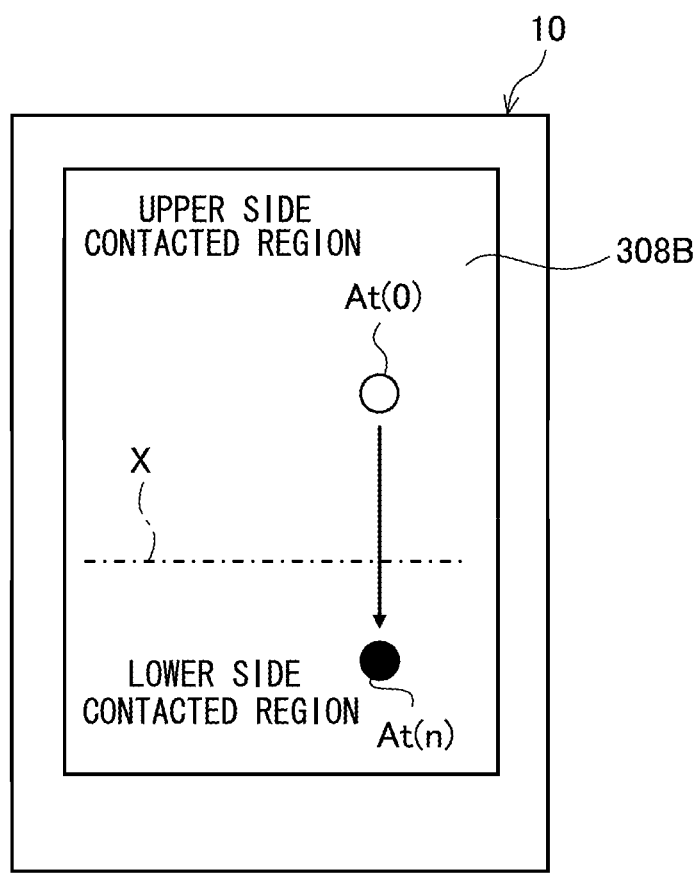
FIG. 8 is a schematic diagram illustrating an example of a reference line set on a touch panel provided to a smartphone according to an exemplary embodiment, configured as a straight line horizontally crossing the touch panel.

In the second slide operation preparation processing illustrated in FIG. 7, first at step 126A, the prediction section 14 determines whether or not the start position is on the upper side of a second reference line. When at step 126A the start position is on the upper side of the second reference line, determination is affirmative and processing transitions to step 126B. As illustrated in for example FIG. 8, the "second reference line" means a straight line X that crosses the touch panel 308A horizontally. In the example illustrated in FIG. 8, the straight line X is disposed to the lower side of the center of the touch panel 308A. Accordingly, the touch panel 308A is broadly divided into an upper side region as viewed from the front (referred to below as the "upper side contacted region"), and a lower side region as viewed from the front (referred to below as the "lower side contacted region"), with the straight line X forming the boundary between the two. In the example illustrated in FIG. 8, a movement path of the contact position from a start position identified by the contact position data At (0) to an end position identified by the contact position data At (n) is illustrated with the start position present in the upper side contacted region. In such a case, determination is affirmative at step 126A. However, when the start position is present in the lower side contacted region, determination is negative at step 126A.

At step 126B, the prediction section 14 turns ON a downward slide prediction flag that expresses a prediction of a downward direction slide operation, after step 126B, processing transitions to step 126C. Note that a "downward direction slide operation" means an operation in which a contact position is moved from the upper side contacted region to the lower side contacted region illustrated for example in FIG. 8 in the direction of the straight line illustrated in FIG. 8.

At step 126A, when the contact position is not present on the upper side of the second reference line (when the contact position is on the lower side (including when the contact position is over the second reference line)), determination is negative and processing transitions to step 126D. At step 126D, the prediction section 14 turns ON an upward slide prediction flag expressing a prediction of an upward direction slide operation, after step 126D, processing transitions to step 126C. Note that an "upward direction slide operation" means an operation in which a contact position is moved from the lower side contacted region to the upper side contacted region illustrated for example in FIG. 8 in the opposite direction to the direction of the straight line illustrated in FIG. 8.

At step 126C, the execution section 16 generates and retains screen data expressing a screen in which the screen that is currently being displayed on the display 308B has been slide moved by a slide amount S, after step 126C, the second slide operation preparation processing is ended. At step 126C, when the downward slide prediction flag has been turned ON, the execution section 16 generates and retains screen data expressing a screen in which the screen that is currently being displayed on the display 308B has been slide moved towards the downward direction by the slide amount S. Moreover, at step 126C, when the upward slide prediction flag has been turned ON, the execution section 16 generates and retains screen data expressing a screen in which the screen that is currently being displayed on the display 308B has been slide moved towards the upward direction by the slide amount S. Note that "a screen that has been slide moved towards the downward direction" means, for example, a screen where a display position of the screen that is currently being displayed on the display 308B has been moved towards the lower side in FIG. 8. Moreover, "a screen that has been slide moved towards the upward direction" means, for example, a screen where a display position of the screen that is currently being displayed on the display 308B is moved towards the upper side in FIG. 8.

In the third slide operation preparation processing illustrated in FIG. 9, first at step 128A the prediction section 14 computes an angle expressing a slide operation direction from a positional relationship between a reference point and the contact position.

Figure 10:
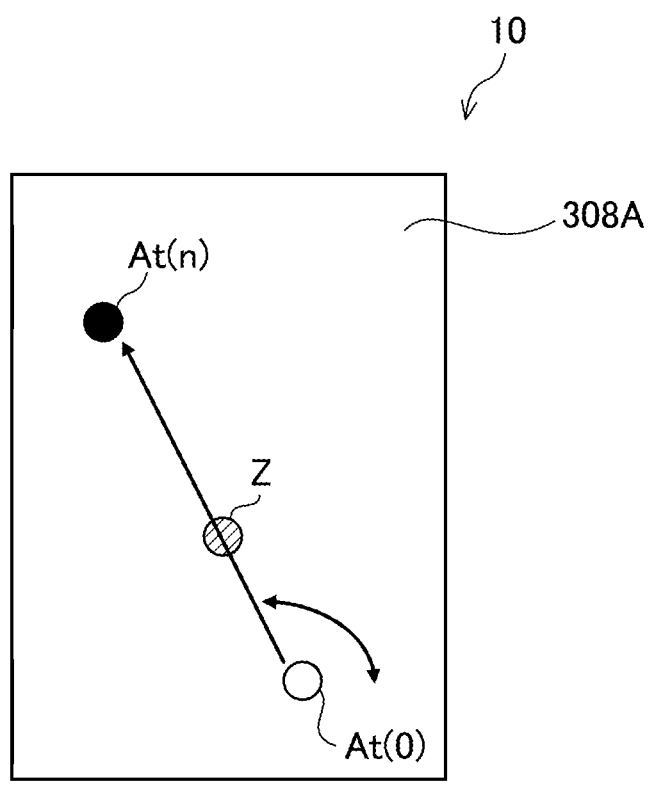
FIG. 10 is a schematic diagram illustrating an example of a reference point set on a touch panel provided to a smartphone according to an exemplary embodiment.

"An angle expressing a slide operation direction" for example means an angle formed between a line segment that joins together a reference point and the contact position, and a specific straight line on the touch panel 308A. Here, "reference point" means 1 point (reference point Z) on the touch panel 308A, as illustrated for example in FIG. 10. In the example illustrated in FIG. 10, a contact position movement path from a start position identified by the contact position data At (0) to an end position identified by the contact position data At (n) is illustrated. Moreover, in the example illustrated in FIG. 10, since the end position is present over an extension line between the start position and the reference point Z, in this case it may be said that the predicted slide operation direction and the actual slide operation direction match each other. Note that in the present exemplary embodiment, "match each other" means matching each other to within a specific margin of error. Accordingly, "the predicted slide operation direction and the actual slide operation direction match each other" for example means matching each other to within an angle of ±3 degrees.

At the next step 128B, the prediction section 14 generates and retains angle data expressing the angle computed at step 128A, after step 128B, processing transitions to step 128C. At step 128C, the execution section 16 generates and retains screen data expressing a screen in which the screen currently being displayed on the display 308B has been slide moved by the slide amount S in the direction of a specific angle, after which third slide operation preparation processing is ended. Note that the direction of the specific angle refers for example to the direction of the angle expressed by the angle data that is being retained at the current point in time.

Figure 12:
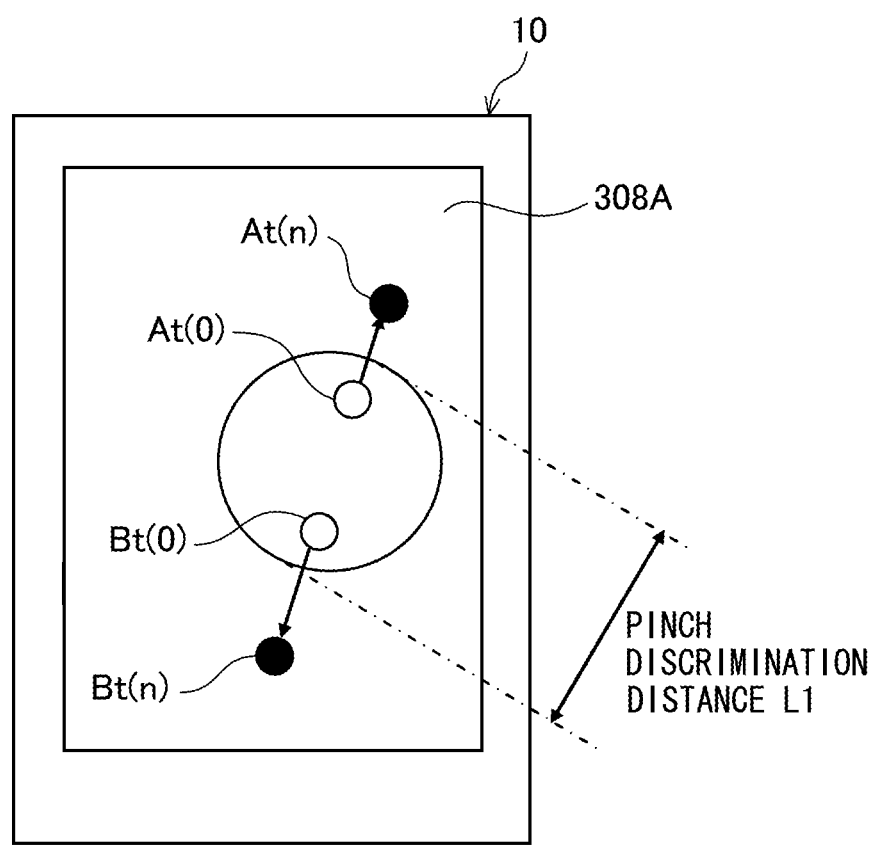
FIG. 12 is a schematic diagram illustrating an example of a relationship between a pinch discrimination distance and movement paths of contact positions in a pinch-out operation, employed in pinch operation preparation processing according to an exemplary embodiment.

In the pinch operation preparation processing illustrated in FIG. 11, first at step 130 the prediction section 14 determines whether or not the distance between a pair of start positions is a pinch discrimination distance L1, that serves as an example of a threshold value of technology disclosed herein, or less. "Between start positions" for example means a distance between a pair of start positions identified by contact position data stored in the specific storage region for each contact position. When at step 130 the distance between the pair of start positions is the pinch discrimination distance L1 or less, determination is affirmative and processing transitions to step 132. FIG. 12 illustrates an example of a relationship between the movement paths of the pair of contact positions and the pinch discrimination distance L1 in a case in which a pinch-out operation is predicted. In the example illustrated in FIG. 12, the distance between a pair of contact positions identified by the contact position data At (0), Bt (0) is shorter than the pinch discrimination distance L1. In a case such as this, determination is affirmative at step 130.

At step 132, the prediction section 14 turns ON a pinch-out prediction flag that expresses a prediction of a pinch-out operation, after step 132, processing transitions to step 134. At step 134, the execution section 16 generates and retains screen data expressing a screen in which the size of the screen currently being displayed on the display 308B has been enlarged by a specific ratio (for example a screen with an enlargement factor M), after step 134, pinch operation preparation processing is ended.

Figure 13:
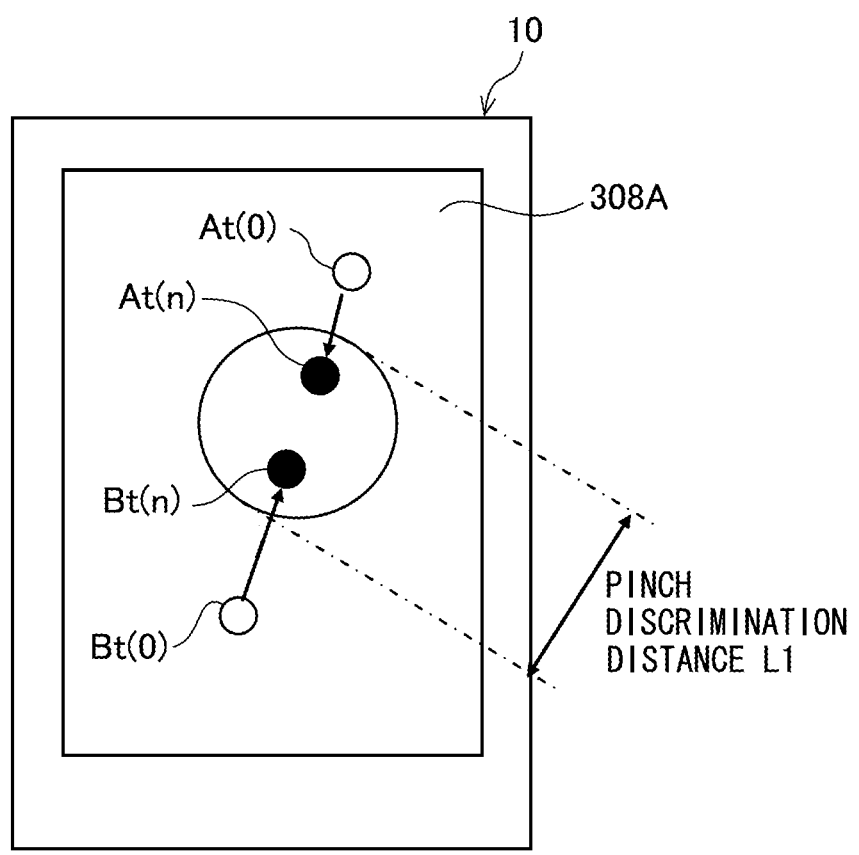
FIG. 13 is a schematic diagram illustrating an example of a positional relationship between a pinch discrimination distance and movement paths of contact positions in a pinch-in operation, employed in pinch operation preparation processing according to an exemplary embodiment.

However, when at step 130 the distance between the pair of start positions exceeds the pinch discrimination distance L1, determination is negative and processing transitions to step 136. FIG. 13 illustrates an example of a relationship between the movement paths of the pair of contact positions and the pinch discrimination distance L1 in a case in which a pinch-in operation is predicted. In the example illustrated in FIG. 13, the distance between the pair of start positions identified by the contact position data At (0), Bt (0) is greater than the pinch discrimination distance L1. In a case such as this, determination is negative at step 130.

At step 136, the prediction section 14 turns ON a pinch-in prediction flag that expresses a prediction of a pinch-in operation, after step 136, processing transitions to step 138. At step 138, the execution section 16 generates and retains screen data expressing a screen in which the size of the screen currently being displayed on the display 308B has been reduced by a specific ratio (for example a screen with a reduction factor N), after which pinch operation preparation processing is ended.

Next, explanation follows regarding the contact operation processing illustrated in FIG. 14. In the contact operation processing illustrated in FIG. 14, first at step 140, the execution section 16 determines whether or not the current number of start positions is 1. When at step 140 the current number of start positions is 1, determination is affirmative and processing transitions to step 142. At step 142, the execution section 16 performs slide operation processing of which an example is illustrated in FIG. 15, after step 142, contact operation processing is ended.

Figure 21:
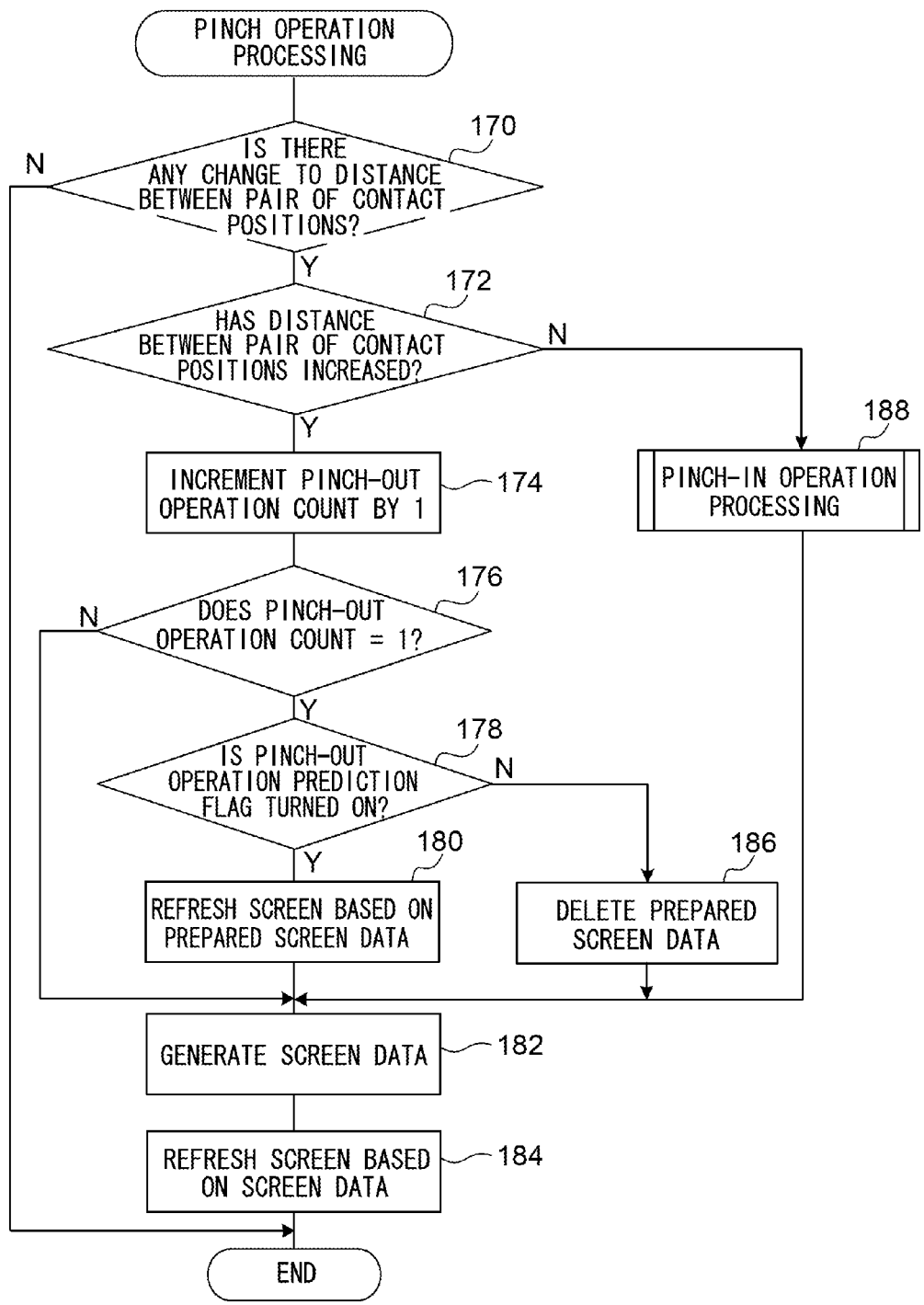
FIG. 21 is a flow chart illustrating an example of a flow of pinch operation processing according to an exemplary embodiment.

When at step 140 the current number of start positions is not 1 (is 2 or more), determination is negative and processing transitions to step 144. At step 144, the execution section 16 performs pinch operation processing of which an example is illustrated in FIG. 21, after step 144, contact operation processing is ended.

Figure 15:
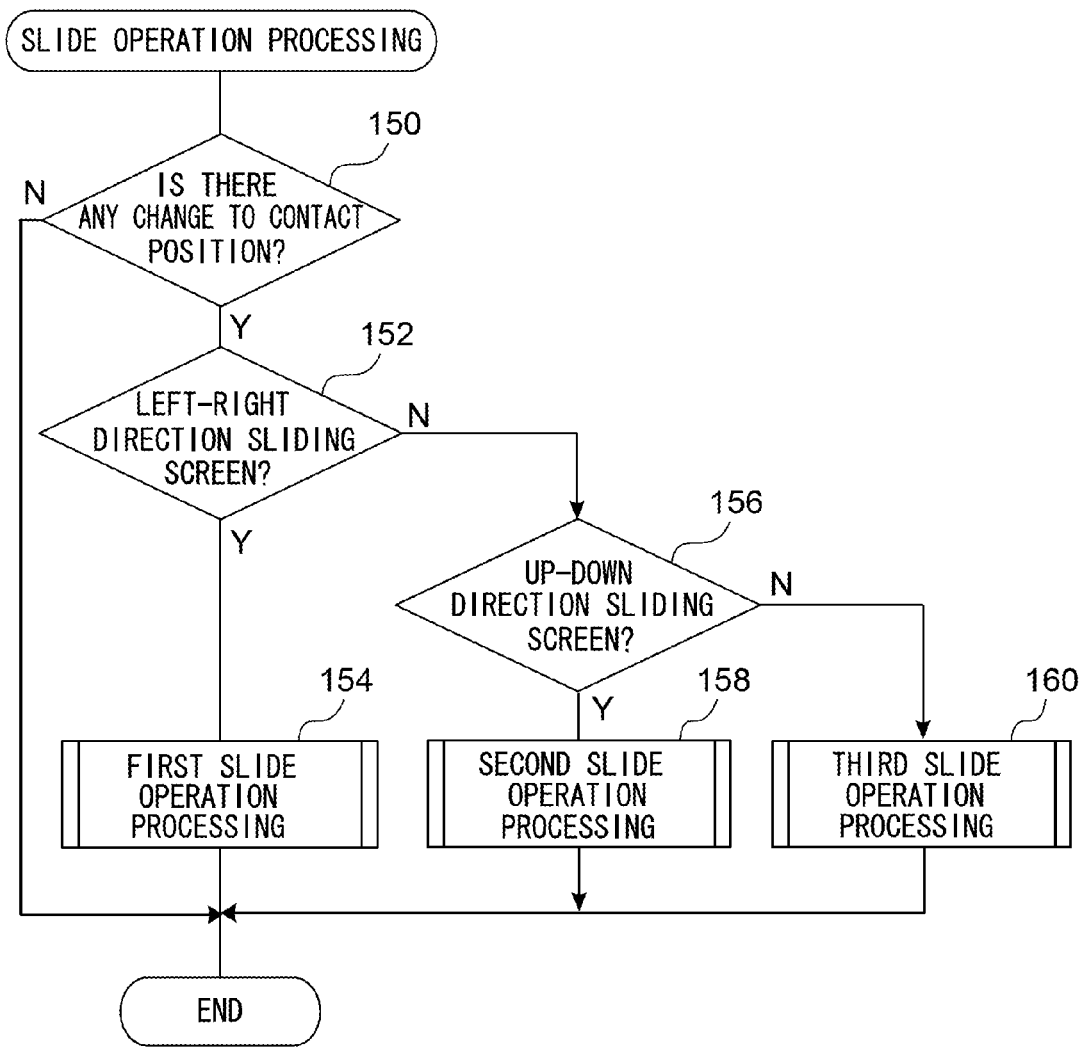
FIG. 15 is a flow chart illustrating an example of a flow of slide operation processing according to an exemplary embodiment.

Next, explanation follows regarding the slide operation processing illustrated in FIG. 15. In the slide operation processing illustrated in FIG. 15, first at step 150, the determination section 26 determines whether or not there has been any change in the contact position of the instructing body on the touch panel 308A. Note that the determination section 26 is able to determine whether or not there has been any change in the contact position by referencing the contact position data stored in a time series in the specific storage region. When at step 150 there has been a change in the contact position of the instructing body on the touch panel 308A, determination is affirmative and processing transitions to step 152. When at step 150 there has not been any change in the contact position of the instructing body on the touch panel 308A, determination is negative and slide operation processing is ended.

At step 152, the determination section 26 determines whether or not the screen currently being displayed on the display 308B is a left-right direction sliding screen. When at step 152 the screen currently being displayed on the display 308B is a left-right direction sliding screen, determination is affirmative and processing transitions to step 154. At step 154, the determination section 26 performs first slide operation processing of which an example is illustrated in FIG. 16, after step 154, slide operation processing is ended.

Figure 18:
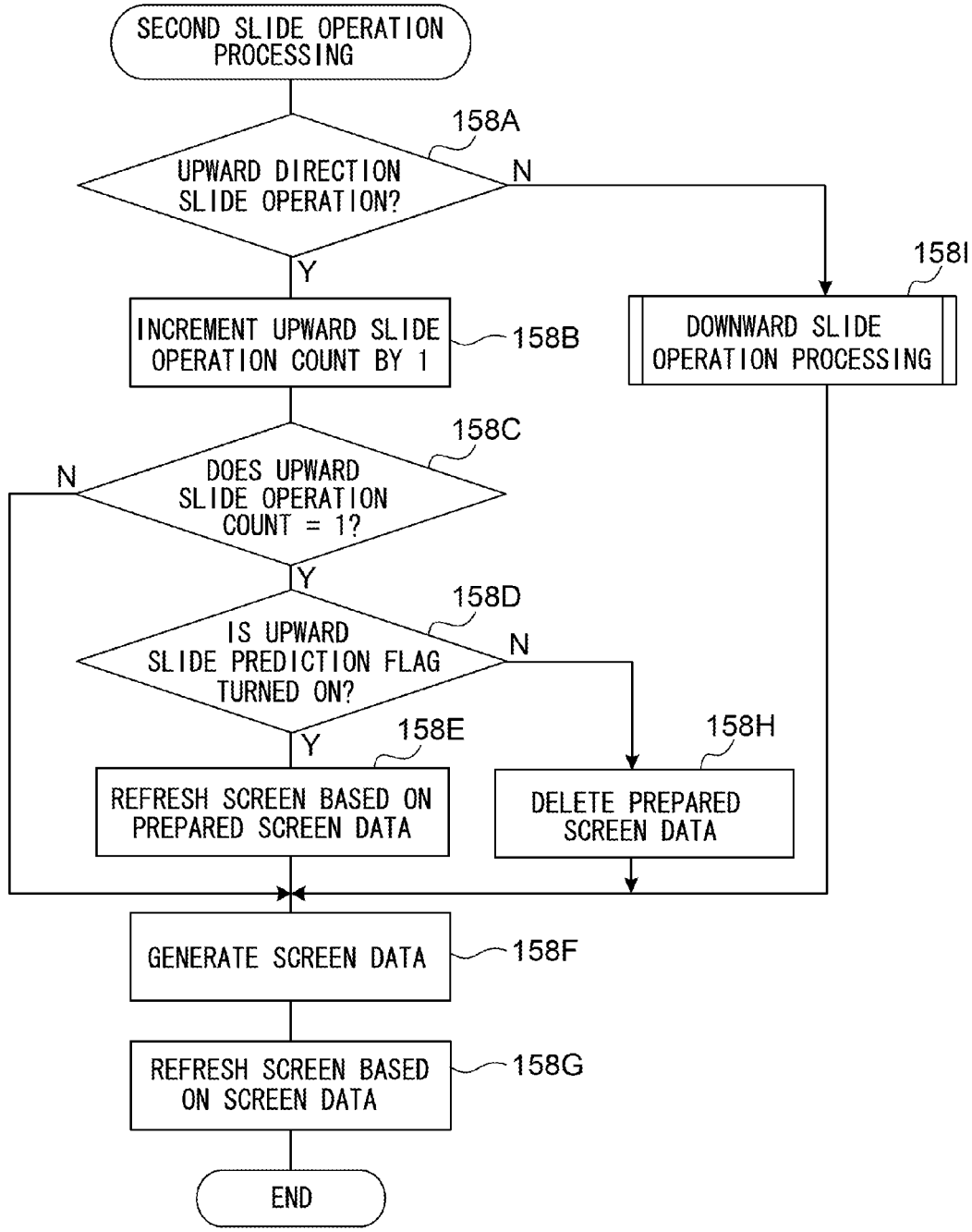
FIG. 18 is a flow chart illustrating an example of a flow of second slide operation processing according to an exemplary embodiment.

However, when at step 152 the screen is not a left-right direction sliding screen, determination is negative and processing transitions to step 156. At step 156, the determination section 26 determines whether or not the screen currently being displayed on the display 308B is an up-down direction sliding screen. When at step 156 the screen currently being displayed on the display 308B is an up-down direction sliding screen, determination is affirmative and processing transitions to step 158. At step 158, the determination section 26 performs second slide operation processing, of which an example is illustrated in FIG. 18, after step 158, slide operation processing is ended.

Figure 20:
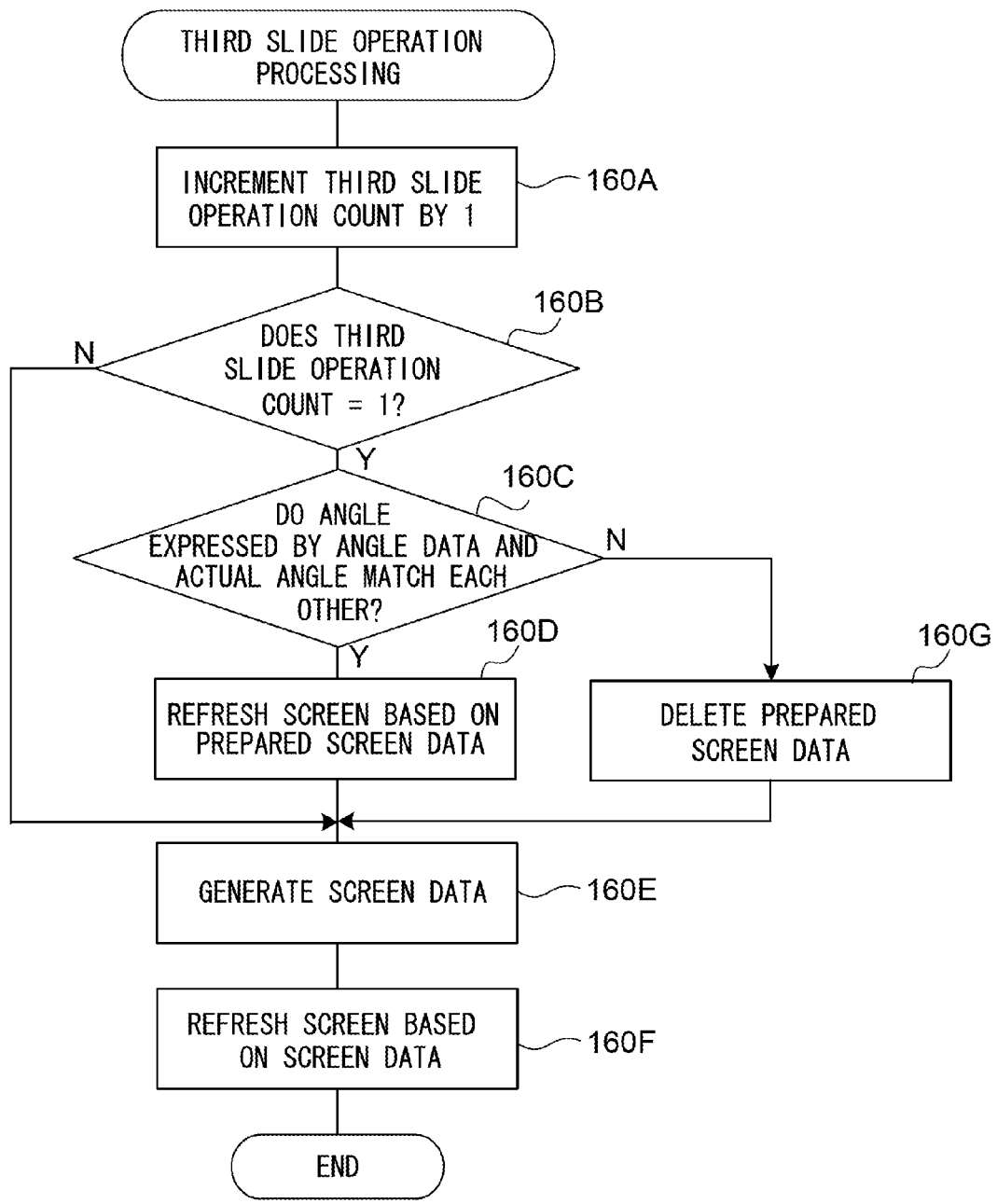
FIG. 20 is a flow chart illustrating an example of a flow of third slide operation processing according to an exemplary embodiment.

However, when at step 156 the screen is not an up-down direction sliding screen (when it is an all-direction sliding screen), determination is negative and processing transitions to step 160. At step 160, the determination section 26 performs third slide operation processing, an example of which is illustrated in FIG. 20, after step 160, slide operation processing is ended.

Figure 16:
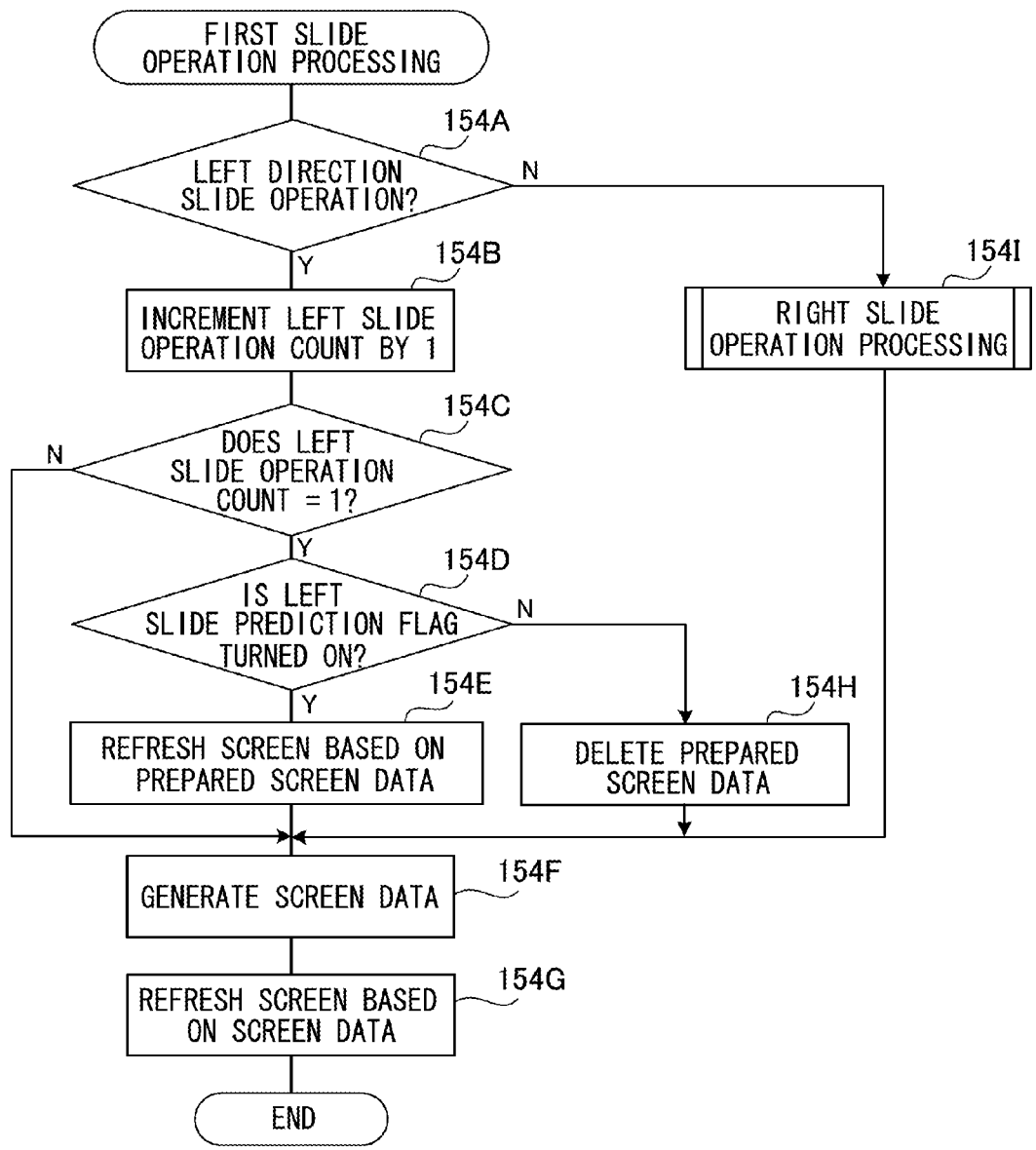
FIG. 16 is a flow chart illustrating an example of a flow of first slide operation processing according to an exemplary embodiment.

Explanation follows regarding the first slide operation processing illustrated in FIG. 16. In the first slide operation processing illustrated in FIG. 16, first at step 154A the determination section 26 determines whether or not a left direction slide operation has been performed. Note that the determination section 26 is able to determine whether or not a left direction slide operation has been performed by referencing the contact position data stored in a time series in the specific storage region. When at step 154A a left direction slide operation has been performed, determination is affirmative and processing transitions to step 154B.

At step 154B, the determination section 26 increments by 1 a left slide operation count (for example a counter with an initial value of 0), after step 153B, processing transitions to step 154C. At step 154C, the determination section 26 determines whether or not the left slide operation count is 1. When at step 154C the left slide operation count is 1, determination is affirmative and processing transitions to step 154D. When at step 154C the left slide operation count is not 1 (when 2 or more), determination is negative and processing transitions to step 154F.

At step 154D, the determination section 26 determines whether or not the left slide prediction flag has been turned ON. Note that when the determination of step 154D has been completed, the left slide prediction flag is turned OFF.

When at step 154D the left slide prediction flag has been turned ON, determination is affirmative and processing transitions to step 154E. At step 154E, the execution section 16 employs the screen data that has already been prepared (the screen data generated at step 122C) to refresh the screen currently being displayed on the display 308B, after step 154E, processing transitions to step 154F. Namely, at step 154E, the execution section 16 replaces the screen currently being displayed on the display 308B with a screen expressed by the screen data generated at step 122C.

At step 154F, the execution section 16 generates screen data expressing a screen in which the current screen has been slid in the left direction by a uniquely determined slide amount based on the contact position data most recently stored in the specific storage region and the contact position data stored in the specific storage region the previous time (1 time prior). "Uniquely determined slide amount" for example means a slide amount corresponding to the distance between the contact position expressed by the most recent contact position data and the contact position expressed by the contact position data stored in the specific storage region the previous time.

At step 154G, the execution section 16 refreshes the screen currently being displayed on the display 308B based on the screen data generated at step 154F, after step 154G, the first slide operation processing is ended. Namely, at step 154G, the execution section 16 replaces the screen currently being displayed on the display 308B with a screen expressed by the screen data generated at step 154F.

However, when at step 154D the left slide prediction flag is not turned ON (for example when the right slide prediction flag is turned ON), determination is negative and processing transitions to step 154H. At step 154H, the execution section 16 deletes the screen data that has already been prepared (the screen data generated at step 122C), after step 154H, processing transitions to step 154F. Namely, at step 154H, the execution section 16 deletes the screen data generated at step 122C described above.

Moreover, when at step 154A a left direction slide operation has not been performed (for example when a right direction slide operation has been performed), determination is negative and processing transitions to step 154I. At step 154I, right slide operation processing, of which an example is illustrated in FIG. 17, is performed, after step 154I, the first slide operation processing is ended.

Figure 17:
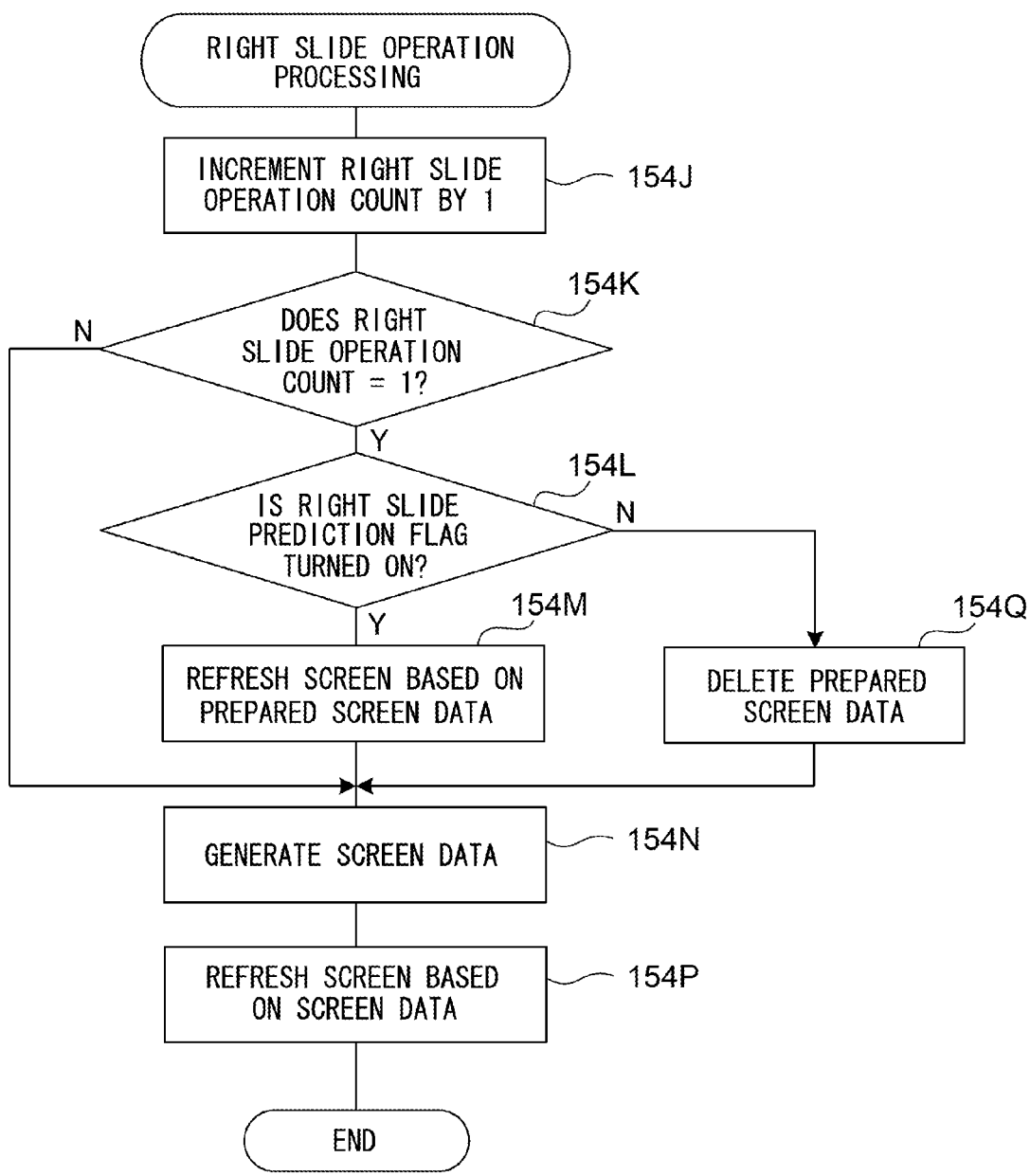
FIG. 17 is a flow chart illustrating an example of a flow of right slide operation processing according to an exemplary embodiment.

Explanation follows regarding the right slide operation processing illustrated in FIG. 17. In the right slide operation processing illustrated in FIG. 17, first at step 154J the determination section 26 increments by 1 a right slide operation count (for example a counter with an initial value of 0), after step 154J, processing transitions to step 154K. At step 154K, the determination section 26 determines whether or not the right slide operation count is 1. When at step 154K the right slide operation count is 1, determination is affirmative and processing transitions to step 154L. When at step 154K the right slide operation count is not 1 (when 2 or more), determination is negative and processing transitions to step 154N.

At step 154L, the determination section 26 determines whether or not the right slide prediction flag has been turned ON. Note that when the determination of step 154L has been completed, the right slide prediction flag is turned OFF.

When at step 154L the right slide prediction flag has been turned ON, determination is affirmative and processing transitions to step 154M. At step 154M, the execution section 16 employs the screen data that has already been prepared (the screen data generated at step 122C) to refresh the screen currently being displayed on the display 308B, after which processing transitions to step 154N. Namely, at step 154M, the execution section 16 replaces the screen currently being displayed on the display 308B with a screen expressed by the screen data generated at step 122C.

At step 154N, the execution section 16 generates screen data expressing a screen in which the current screen has been slid in the right direction by a uniquely determined slide amount based on the contact position data most recently stored in the specific storage region and the contact position data stored in the specific storage region the previous time (1 time prior).

At step 154P, the execution section 16 refreshes the screen currently being displayed on the display 308B based on the screen data generated at step 154N, after step 154P, right slide operation processing is ended. Namely, at step 154P, the execution section 16 replaces the screen currently being displayed on the display 308B with a screen expressed by the screen data generated at step 154N.

However, when at step 154L the right slide prediction flag is not turned ON (for example when the left slide prediction flag is turned ON), determination is negative and processing transitions to step 154Q. At step 154Q, the execution section 16 deletes the screen data that has already been prepared (the screen data generated at step 122C), after step 154Q, processing transitions to step 154N. Namely, at step 154Q, the execution section 16 deletes the screen data generated at step 122C described above.

Next, explanation follows regarding the second slide operation processing illustrated in FIG. 18. In the second slide operation processing illustrated in FIG. 18, first at step 158A the determination section 26 determines whether or not an upward direction slide operation has been performed. Note that the determination section 26 is able to determine whether or not an upward direction slide operation has been performed by referencing the contact position data stored in a time series in the specific storage region. When at step 158A an upward direction slide operation has been performed, determination is affirmative and processing transitions to step 158B.

At step 158B, the determination section 26 increments by 1 an upward slide operation count (for example a counter with an initial value of 0), after which processing transitions to step 158C. At step 158C, the determination section 26 determines whether or not the upward slide operation count is 1. When at step 158C the upward slide operation count is 1, determination is affirmative and processing transitions to step 158D. When at step 158C the upward slide operation count is not 1 (when 2 or more), determination is negative and processing transitions to step 158F.

At step 158D, the determination section 26 determines whether or not the upward slide prediction flag has been turned ON. Note that when the determination of step 158D has been completed, the upward slide prediction flag is turned OFF.

When at step 158D the upward slide prediction flag has been turned ON, determination is affirmative and processing transitions to step 158E. At step 158E, the execution section 16 employs the screen data that has already been prepared (the screen data generated at step 126C) to refresh the screen currently being displayed on the display 308B, after step 158E, processing transitions to step 158F. Namely, at step 158E, the execution section 16 replaces the screen currently being displayed on the display 308B with a screen expressed by the screen data generated at step 126C.

At step 158F, the execution section 16 generates screen data expressing a screen in which the current screen has been slid in the upward direction by a uniquely determined slide amount based on the contact position data most recently stored in the specific storage region and the contact position data stored in the specific storage region the previous time (1 time prior).

At step 158G, the execution section 16 refreshes the screen currently being displayed on the display 308B based on the screen data generated at step 158F, after step 158G, second slide operation processing is ended. Namely, at step 158G, the execution section 16 replaces the screen currently being displayed on the display 308B with a screen expressed by the screen data generated at step 158F.

However, when at step 158D the upward slide prediction flag is not turned ON (for example when the downward slide prediction flag is turned ON), determination is negative and processing transitions to step 158H. At step 158H, the execution section 16 deletes the screen data that has already been prepared (the screen data generated at step 126C), after step 158H, processing transitions to step 158F. Namely, at step 158H, the execution section 16 deletes the screen data generated at step 126C described above.

Moreover, when at step 158A an upward direction slide operation has not been performed (for example when a downward direction slide operation has been performed), determination is negative and processing transitions to step 158I. At step 158I, downward slide operation processing is performed, after step 158I, the second slide operation processing is ended.

Figure 19:
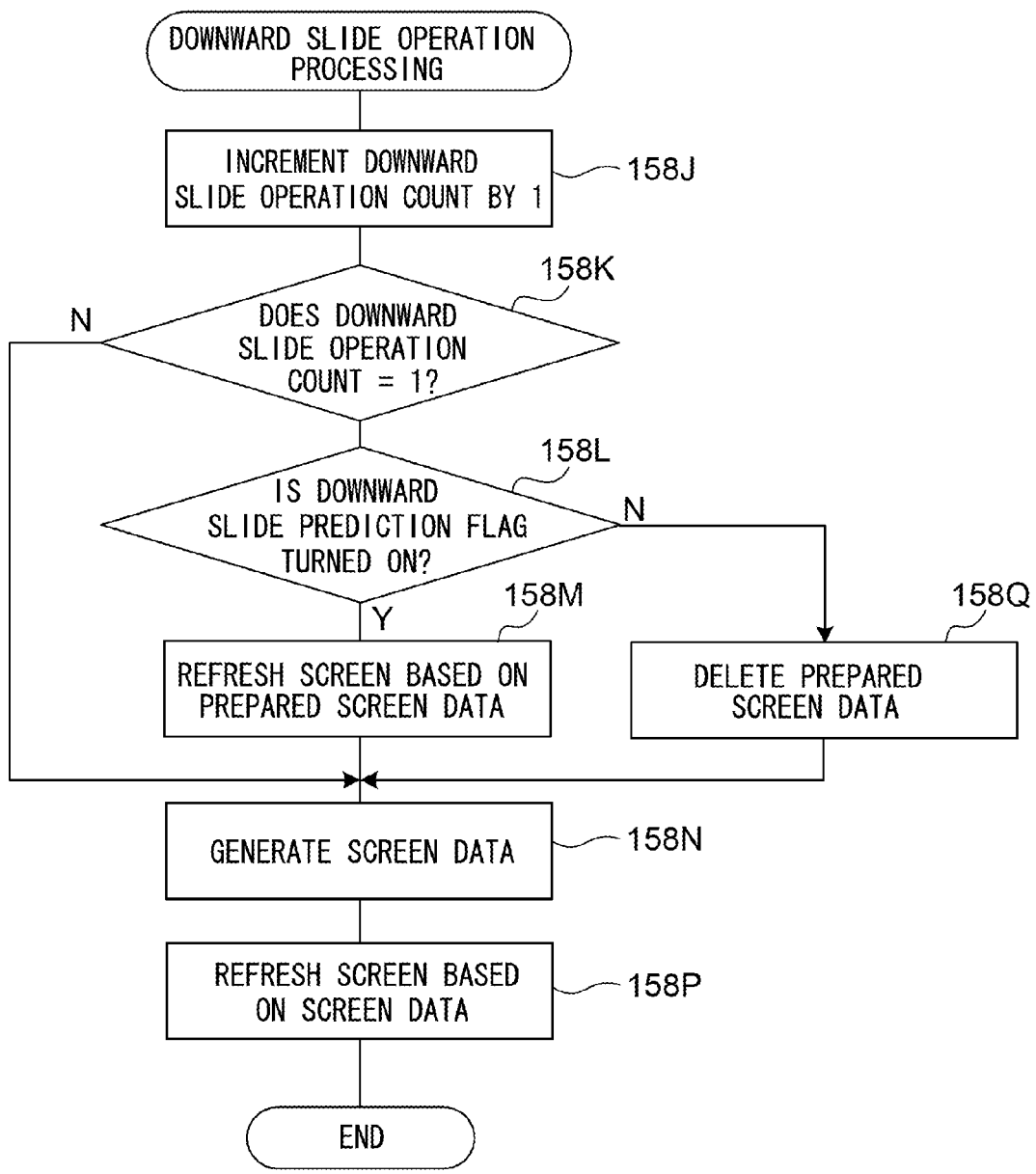
FIG. 19 is a flow chart illustrating an example of a flow of downward slide operation processing according to an exemplary embodiment.

Next, explanation follows regarding the downward slide operation processing illustrated in FIG. 19. In the downward slide operation processing illustrated in FIG. 19, first at step 158J the determination section 26 increments by 1 a downward slide operation count (for example a counter with an initial value of 0), after step 158J, processing transitions to step 158K. At step 158K, the determination section 26 determines whether or not the downward slide operation count is 1. When at step 158K the downward slide operation count is 1, determination is affirmative and processing transitions to step 158L. When at step 158K the downward slide operation count is not 1 (when 2 or more), determination is negative and processing transitions to step 158N.

At step 158L, the determination section 26 determines whether or not the downward slide prediction flag has been turned ON. Note that when the determination of step 158L has been completed, the downward slide prediction flag is turned OFF.

When at step 158L the downward slide prediction flag has been turned ON, determination is affirmative and processing transitions to step 158M. At step 158M, the execution section 16 employs the screen data that has already been prepared (the screen data generated at step 126C) to refresh the screen currently being displayed on the display 308B, after step 158M, processing transitions to step 158N. Namely, at step 158M, the execution section 16 replaces the screen currently being displayed on the display 308B with a screen expressed by the screen data generated at step 126C.

At step 158N, the execution section 16 generates screen data expressing a screen in which the current screen has been slid in the downward direction by a uniquely determined slide amount based on the contact position data most recently stored in the specific storage region and the contact position data stored in the specific storage region the previous time (1 time prior).

At step 158P, the execution section 16 refreshes the screen currently being displayed on the display 308B based on the screen data generated at step 158N, after step 158P, the downward slide operation processing is ended. Namely, at step 158P, the execution section 16 replaces the screen currently being displayed on the display 308B with a screen expressed by the screen data generated at step 158N.

However, when at step 158L the downward slide prediction flag is not turned ON (for example when the upward slide prediction flag is turned ON), determination is negative and processing transitions to step 158Q. At step 158Q, the execution section 16 deletes the screen data that has already been prepared (the screen data generated at step 126C), after step 158Q, processing transitions to step 158N. Namely, at step 158Q, the execution section 16 deletes the screen data generated at step 126C above.

Explanation follows regarding the third slide operation processing illustrated in FIG. 20. In the third slide operation processing illustrated in FIG. 20, first at step 160A the determination section 26 increments by 1 a third slide operation count (for example a counter with an initial value of 0), after step 160A, processing transitions to step 160B. At step 160B, the determination section 26 determines whether or not the third slide operation count is 1. When at step 160B the third slide operation count is 1, determination is affirmative and processing transitions to step 160C. When at step 160B the third slide operation count is not 1 (when 2 or more), determination is negative and processing transitions to step 160E.

At step 160C, the determination section 26 determines whether or not the angle expressed by the angle data generated at step 128B and the angle of the contact position movement direction on the touch panel 308A of the actual slide operation match each other. Note that the execution section 16 is able to identify the angle of the contact position movement direction on the touch panel 308A of the actual slide operation by referencing against the contact position data stored in time series for each contact position in the specific storage region. Note that when the determination of step 160C has been completed, the angle data retained at step 128B is deleted.

When at step 160C the angle expressed by the angle data generated at step 128B and the angle of the contact position movement direction on the touch panel 308A of the actual slide operation match each other, determination is affirmative and processing transitions to step 160D.

At step 160D, the execution section 16 employs the screen data that has already been prepared (the screen data generated at step 128C) to refresh the screen currently being displayed on the display 308B, after step 160D, processing transitions to step 160E. Namely, at step 160D, the execution section 16 replaces the screen currently being displayed on the display 308B with a screen expressed by the screen data generated at step 128C.

At step 160E, the execution section 16 generates screen data expressing a screen in which the current screen has been slid in the direction of a specific angle by a uniquely determined slide amount based on the contact position data most recently stored in the specific storage region and the contact position data stored in the specific storage region the previous time. Note that the "specific angle" is determined based on the contact position data most recently stored in the specific storage region and the contact position data stored in the specific storage region the previous time. Namely the execution section 16 is able to identify the direction (the specific angle) in which the screen currently being displayed is being slid by referencing the most recent contact position data in the specific storage region with the contact position data stored in the specific storage region the previous time.

At step 160F, the execution section 16 refreshes the screen currently being displayed on the display 308B based on the screen data generated at step 160E, after step 160F, third slide operation processing is ended. Namely, at step 160F, the execution section 16 replaces the screen currently being displayed on the display 308B with a screen expressed by the screen data generated at step 160E.

However, when at step 160C the angle expressed by the angle data generated at step 128 and the angle of the contact position movement direction on the touch panel 308A of the actual slide operation do not match each other, determination is negative and processing transitions to step 160G. At step 160G, the execution section 16 deletes the screen data that has already been prepared (the screen data generated at step 128C), after step 160G, processing transitions to step 160E. Namely, at step 160G the execution section 16 deletes the screen data generated at step 128C.

FIG. 21 is a flow chart illustrating an example of a flow of pinch operation processing. In the pinch operation processing illustrated in FIG. 21, first at step 170 the determination section 26 determines whether or not there has been any change to the distance between the pair of contact positions. Namely the determination section 26 is able to determine whether or not there has been any change to the distance between the pair of contact positions by referencing the contact position data stored in time series in the specific storage region. When at step 170 there has been a change in the distance between the pair of contact positions, determination is affirmative and processing transitions to step 172. When at step 170 there has not been any change in the distance between the pair of contact positions, determination is negative and pinch operation processing is ended.

At step 172, the determination section 26 determines whether or not the distance between the pair of contact positions has increased. Note that the determination section 26 is able to determine whether or not the distance between the pair of contact positions has increased by referencing the contact position data stored in time series in the specific storage region. When at step 172 the distance between the pair of contact positions has increased, determination is affirmative and processing transitions to step 174.

At step 174, the determination section 26 increments by 1 a pinch-out operation count (for example a counter with an initial value of 0), after step 174, processing transitions to step 176. At step 176, the determination section 26 determines whether or not the pinch-out operation count is 1. When at step 176 the pinch-out operation count is 1, determination is affirmative and processing transitions to step 178. When at step 176 the pinch-out operation count is not 1 (is 2 or more), determination is negative and processing transitions to step 182.

At step 178, the determination section 26 determines whether or not the pinch-out prediction flag has been turned ON. When at step 178 the pinch-out prediction flag has been turned ON, determination is affirmative and processing transitions to step 180. At step 180, the execution section 16 employs the screen data that has already been prepared (the screen data generated at step 134) to refresh the screen currently being displayed on the display 308B, after step 180, processing transitions to step 182. Namely, at step 180, the execution section 16 replaces the screen currently being displayed on the display 308B with a screen expressed by the screen data generated at step 134.

At step 182, the execution section 16 generates screen data that expresses a screen in which the current screen has been enlarged by a uniquely determined enlargement factor based on the most recent contact position data and the contact position data stored the previous time out of the contact position data stored for each start position in the specific storage region. "Uniquely determined enlargement factor" for example means a ratio of the distance between the pair of contact positions expressed by each of the most recent contact position data stored in the specific storage region against the distance between the pair of contact positions expressed by each of the contact position data for each start position that were stored in the specific storage region the previous time.

At step 184, the execution section 16 refreshes the screen currently being displayed on the display 308B based on the screen data generated at step 182, after step 184, pinch operation processing is ended. Namely at step 184, the execution section 16 replaces the screen currently being displayed on the display 308B with a screen expressed by the screen data generated at step 182.

However, when at step 178 the pinch-out prediction flag is not turned ON (for example when the pinch-in prediction flag is turned ON), determination is negative and processing transitions to step 186. At step 186, the execution section 16 deletes the screen data that has already been prepared (the screen data generated at step 134), after step 186, processing transitions to step 182. Namely at step 186, the execution section 16 deletes the screen data generated at step 134.

However, when at step 172 the distance between the pair of contact positions has not increased (when it has decreased), determination is negative and processing transitions to step 188. At step 188, pinch-in operation processing, an example of which is illustrated in FIG. 22, is performed, after step 188, pinch-in operation processing is ended.

Figure 22:
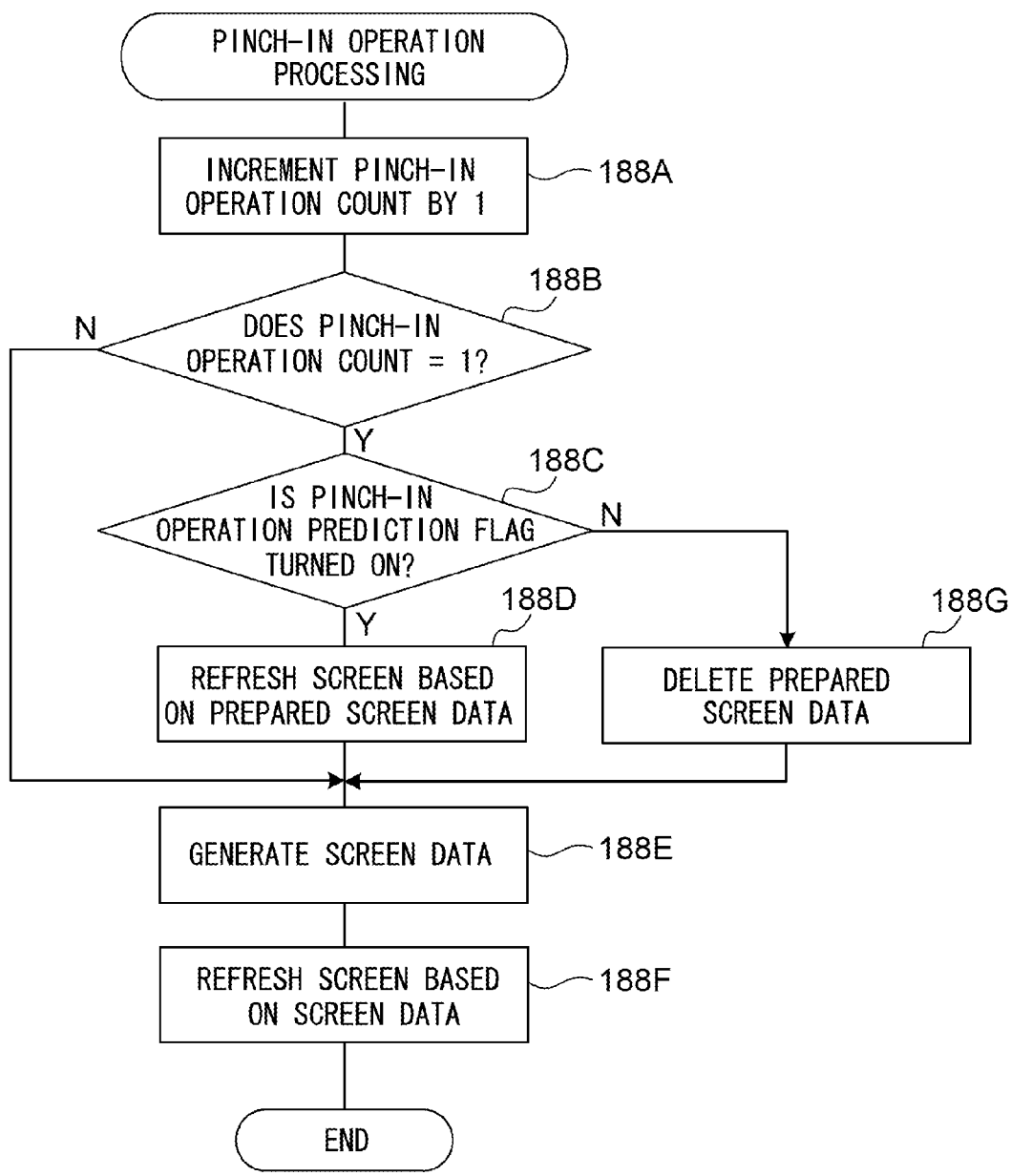
FIG. 22 is a flow chart illustrating an example of a flow of pinch-in operation processing according to an exemplary embodiment.

Next, explanation follows regarding the pinch-in operation processing illustrated in FIG. 22. In the pinch-in operation processing illustrated in FIG. 22, first at step 188A the determination section 26 increments by 1 a pinch-in operation count (for example a counter with an initial value of 0), after step 188A, processing transitions to step 188B. At step 188B, the determination section 26 determines whether or not the pinch-in operation count is 1. When at step 188B the pinch-in operation count is 1, determination is affirmative and processing transitions to step 188C. When at step 188B the pinch-in operation count is not 1 (is 2 or more), determination is negative and processing transitions to step 188E.

At step 188C, the determination section 26 determines whether or not the pinch-in prediction flag has been turned ON. When at step 188C the pinch-in prediction flag has been turned ON, determination is affirmative and processing transitions to step 188D. At step 188D, the execution section 16 employs the screen data that has already been prepared (the screen data generated at step 138) to refresh the screen currently being displayed on the display 308B, after step 188D, processing transitions to step 188E. Namely, at step 188D, the execution section 16 replaces the screen currently being displayed on the display 308B with a screen expressed by the screen data generated at step 138.

At step 188E, the execution section 16 generates screen data that expresses a screen in which the current screen has been reduced by a uniquely determined reduction factor based on the most recent contact position data and the contact position data stored the previous time out of the contact position data stored for each start position in the specific storage region. "Uniquely determined reduction factor" means, for example, a ratio of the distance between the pair of contact positions expressed by each of the most recent contact position data stored in the specific storage region against the distance between the pair of contact positions expressed by each of the contact position data for each start position that were stored in the specific storage region the previous time.

At step 188F, the execution section 16 refreshes the screen currently being displayed on the display 308B based on the screen data generated at step 188E, after step 188F, pinch-in operation processing is ended. Namely at step 188F, the execution section 16 replaces the screen currently being displayed on the display 308B with a screen expressed by the screen data generated at step 188E.

However, when at step 188C the pinch-in prediction flag is not turned ON (for example when the pinch-out prediction flag is turned ON), determination is negative and processing transitions to step 188G. At step 188G, the execution section 16 deletes the screen data that has already been prepared (the screen data generated at step 138), after step 188G, processing transitions to step 188E. Namely at step 188G, the execution section 16 deletes the screen data generated at step 138.

Figure 23:
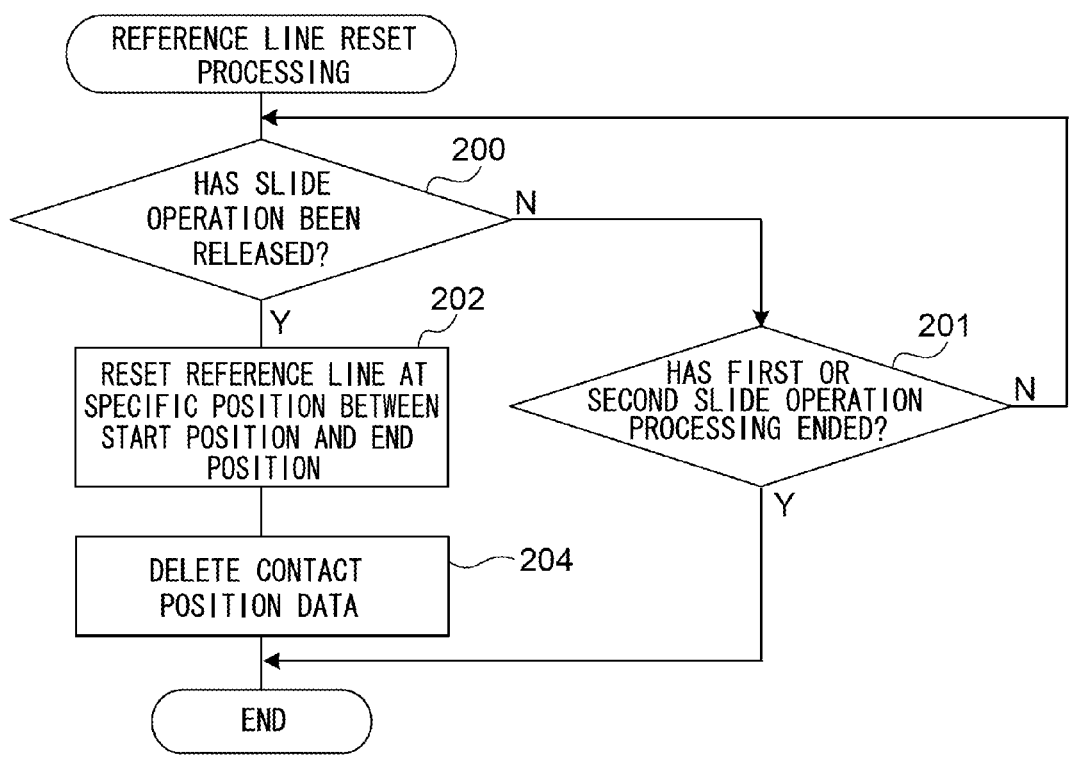
FIG. 23 is a flow chart illustrating an example of a flow of reference line reset processing according to an exemplary embodiment.

Next, explanation follows with reference to FIG. 23 regarding reference line reset processing performed by the smartphone 10 by the CPU 42 executing the reference line reset processing program 52 when the first slide operation processing or the second slide operation processing has been performed.

In the reference line reset processing illustrated in FIG. 23, at step 200 the reference line reset section 18 determines whether or not a slide operation of the touch panel 308A has been released (for example whether or not the instructing body has been removed from the touch panel 308A). When at step 200 the slide operation of the touch panel 308A has been released, determination is affirmative and processing transitions to step 202. When at step 200 slide operation of the touch panel 308A has not been released (when the slide operation is ongoing), determination is negative and processing transitions to step 201.

At step 201, the reference line reset section 18 determines whether or not first or second slide operation processing has ended. When at step 201 first or second slide operation processing has ended, determination is affirmative and reference line reset processing is ended. When at step 201 first or second slide operation processing has not ended, determination is negative and processing transitions to step 200.

At step 202, the reference line reset section 18 resets the reference line (the first reference line or the second reference line) by performing parallel movement of the current reference line to a specific position between the start position and the end position of the slide operation based on the contact position data of the specific storage region. Here, an example is given wherein the "specific position" is for example a position corresponding to the center between the start position and the end position of the slide operation, however the technology disclosed herein is not limited thereto. For example, configuration may be made with a position between the start position and the end position of the slide operation that is a specific amount from the center towards the start position side or the end position side as the specific position.

At the next step 204, the reference line reset section 18 deletes the contact position data that is currently stored in the specific storage region, after step 204, reference line reset processing is ended.

Figure 24:
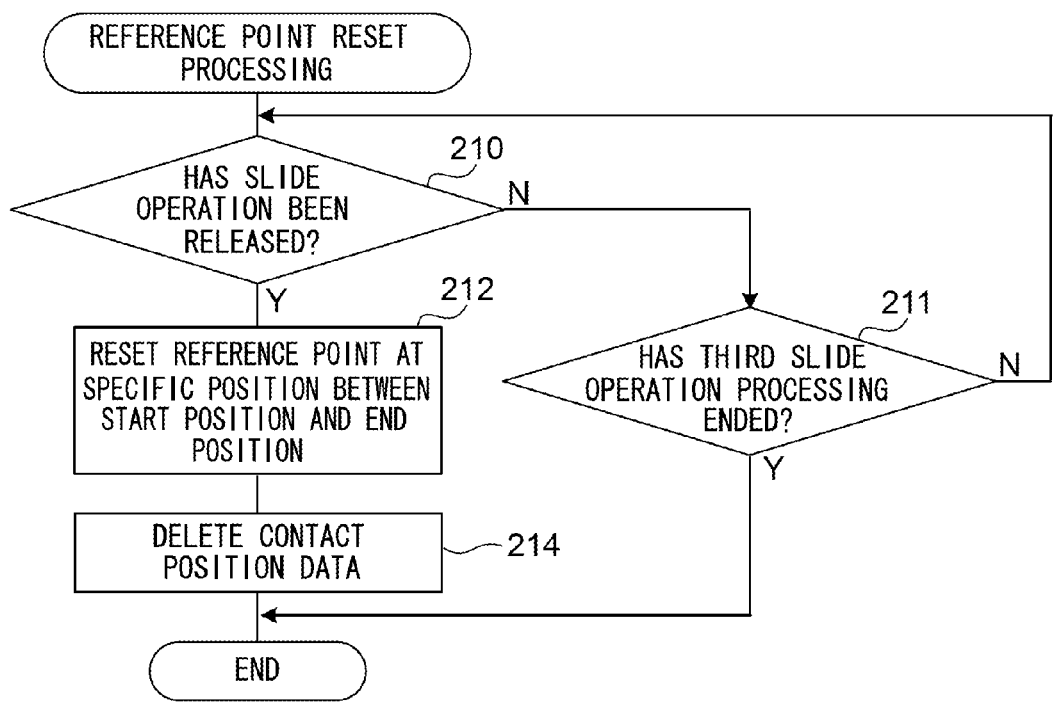
FIG. 24 is a flow chart illustrating an example of a flow of reference point reset processing according to an exemplary embodiment.

Next, explanation follows with reference to FIG. 24 regarding reference point reset processing performed by the smartphone 10 by the CPU 42 executing the reference point reset processing program 54 when the third slide operation processing has been performed.

In the reference point reset processing illustrated in FIG. 24, at step 210 the reference point reset section 20 determines whether or not a slide operation of the touch panel 308A has been released (for example whether or not the instructing body has been removed from the touch panel 308A). When at step 210 the slide operation of the touch panel 308A has been released, determination is affirmative and processing transitions to step 212. When at step 210 slide operation of the touch panel 308A has not been released (when the slide operation is ongoing) determination is negative and processing transitions to step 211.

At step 211, the reference point reset section 20 determines whether or not third slide operation processing has ended. When at step 211 third slide operation processing has ended, determination is affirmative and reference point reset processing is ended. When at step 211 third operation processing has not ended, determination is negative and processing transitions to step 210.

At step 212, the reference point reset section 20 resets the reference point by moving the reference point to a specific position between the start position and the contact end position of the slide operation based on the contact position data of the specific storage region. Here, an example is given wherein the "specific position" is for example a position corresponding to the center between the start position and the end position of the slide operation.

At the next step 214, the reference point reset section 20 deletes the contact position data that is currently stored in the specific storage region, after step 214, reference point reset processing is ended.

Figure 25:
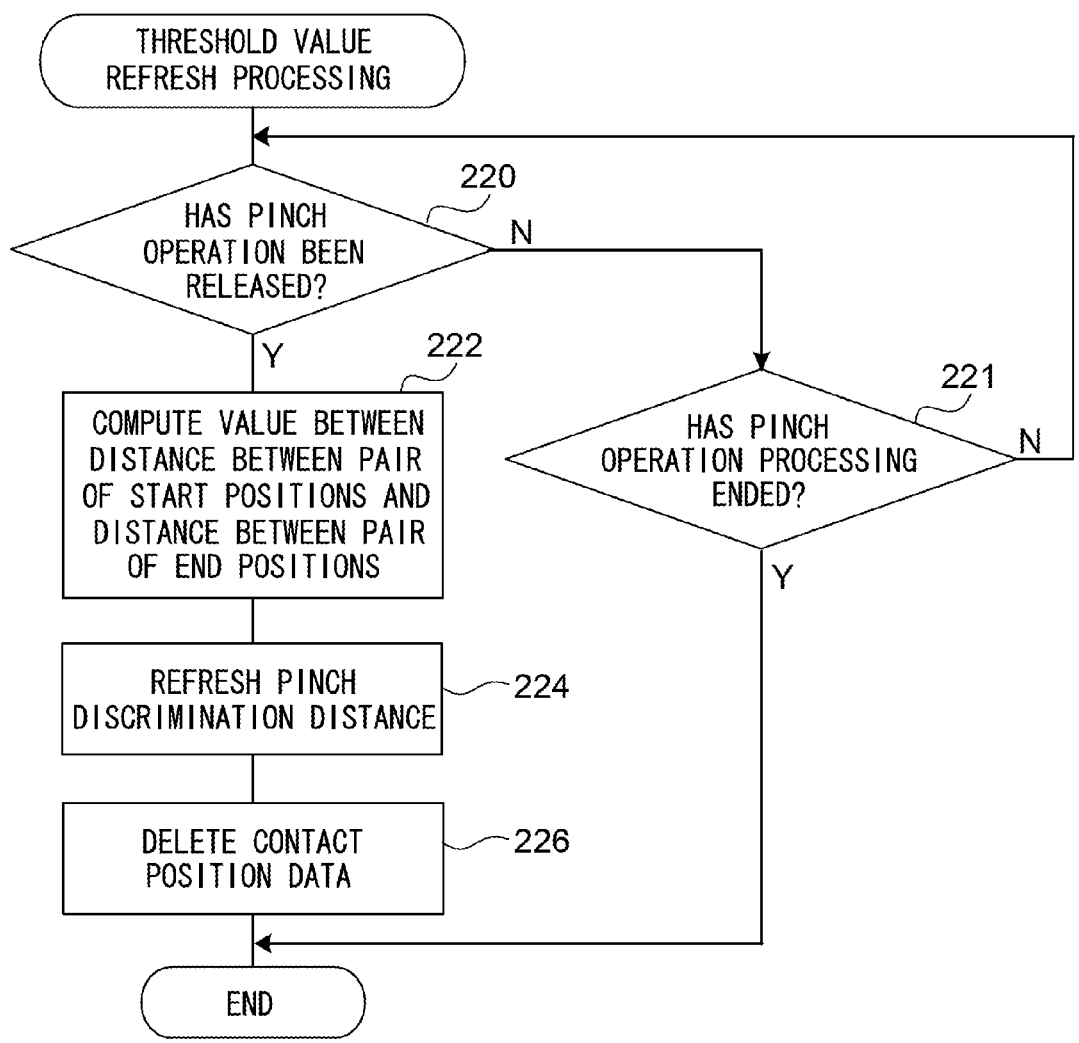
FIG. 25 is a flow chart illustrating an example of a flow of threshold value refresh processing according to an exemplary embodiment.

Explanation follows with reference to FIG. 25 regarding the threshold value refresh processing performed by the smartphone 10 by the CPU 42 executing the threshold value refresh processing program 56 when pinch operation processing has been performed.

In the threshold value refresh processing illustrated in FIG. 25, at step 220 the refresh section 22 determines whether or not a pinch operation of the touch panel 308A has been released (for example whether or not the 2 instructing bodies have been removed from the touch panel 308A). When at step 220 the pinch operation of the touch panel 308A has been released, determination is affirmative and processing transitions to step 222. When at step 220 the pinch operation of the touch panel 308A has not been released (when the pinch operation is ongoing), determination is negative and processing transitions to step 221.

At step 221, the refresh section 22 determines whether or not pinch operation processing has ended. When at step 221 pinch operation processing has ended, determination is affirmative and threshold value refresh processing is ended. When at step 221 pinch operation processing has not ended, determination is negative and processing transitions to step 220.

At step 222, the refresh section 22 computes a distance (referred to below as "intermediate distance") corresponding to a distance between the distance between the pair of start positions and the distance between the pair of end positions. At step 222, the refresh section 22 is able to compute the intermediate distance by referencing the contact position data stored in time series for each start position in the specific storage region. Here, an example is given wherein the "intermediate distance" is for example an average value of the distance between the pair of start positions and the distance between the pair of end positions, however the technology disclosed herein is not limited thereto. For example, configuration may be made with the intermediate distance set as any value that is between the distance between the pair of start positions and distance between the pair of end positions, and may for be a value obtained by multiplying an average value by a specific coefficient.

At the next step 224, the refresh section 22 refreshes the pinch discrimination distance L1 by changing the currently set pinch discrimination distance L1 to a value corresponding to the intermediate distance computed at step 222.

At the next step 226, the refresh section 22 deletes the contact position data currently stored in the specific storage region, after step 226, threshold value refresh processing is ended.

Figure 26:
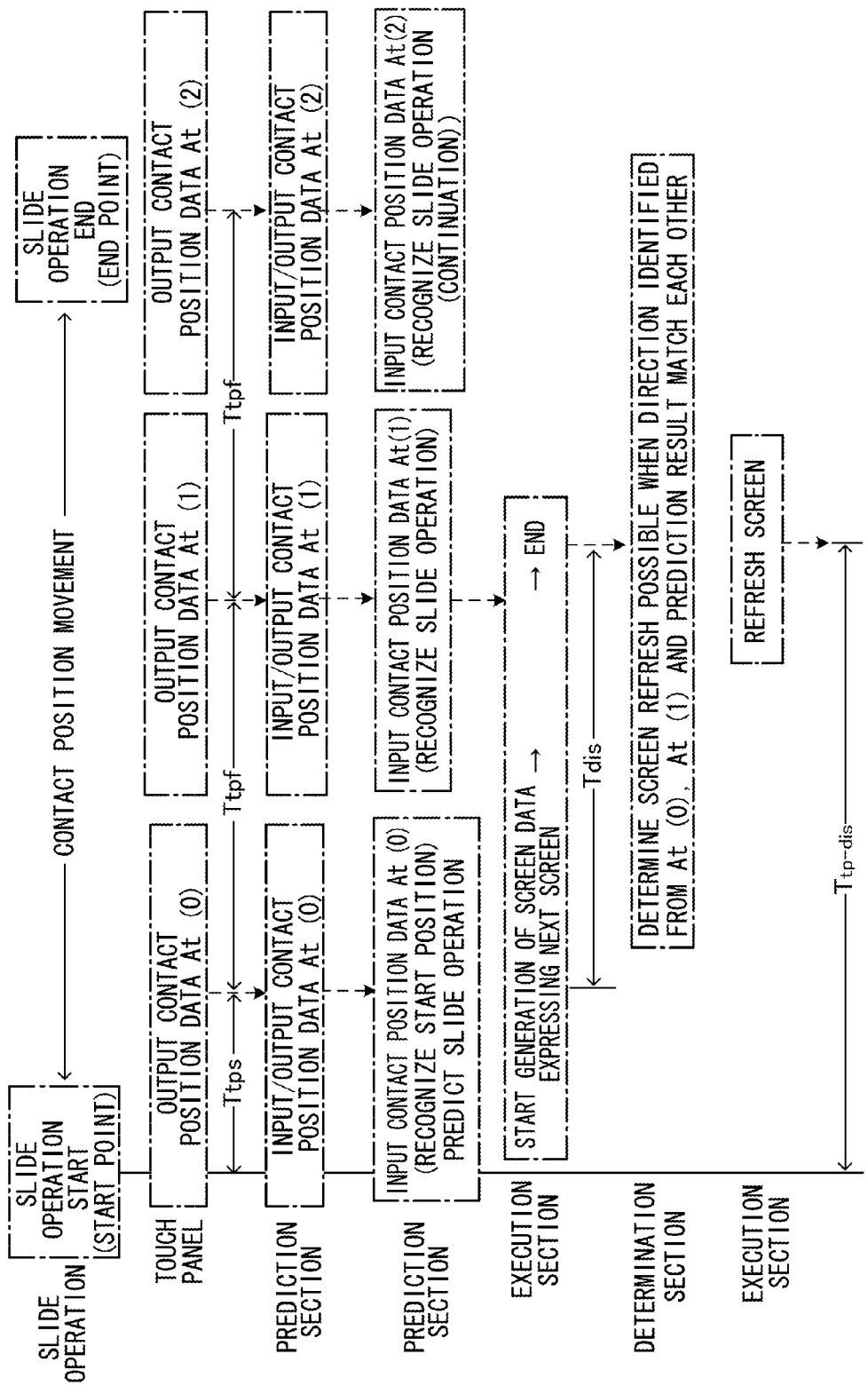
FIG. 26 is a sequence diagram illustrating an example of a flow of processing performed by a computer and a touch panel according to a slide operation performed on the touch panel provided to a smartphone according to an exemplary embodiment.

Explanation follows regarding a flow of processing performed by the computer 40 and the touch panel 308A, illustrated in FIG. 26. Note that in the example illustrated in FIG. 26, the processing performed by the computer 40 is illustrated by the functions realized by the prediction section 14, the execution section 16, and the determination section 26.

As illustrated in FIG. 26, at the start of contact to the touch panel 308A by the instructing body, the touch panel 308A detects contact of the instructing body and outputs the contact position data At (0) to the prediction section 14 after the duration Ttps. The prediction section 14 acquires the contact position data At (0) output from the touch panel 308A.

When the touch panel 308A has output the contact position data At (0), the touch panel 308A outputs the contact position data At (n) to the prediction section 14 at every duration Ttpf until the contact state of the instructing body is released. The prediction section 14 acquires the contact position data At (n) each time contact of the instructing body is detected and the contact position data At (n) is output by the touch panel 308A.

When the prediction section 14 has acquired the contact position data At (0), the prediction section 14 predicts that the contact operation that is going to be attempted is a slide operation. Next, the execution section 16 generates screen data (referred to below as "first prediction stage-generated screen data") expressing a screen for next slide display on the display 308B. The required duration to generate the first prediction stage-generated screen data is for example the duration Tdis.

When the prediction section 14 has acquired the contact position data At (1), the prediction section 14 recognizes that the contact operation currently being performed is a slide operation. The determination section 26 determines whether or not the prediction result of the prediction section 14 and the actual contact operation match each other. When the prediction result of the prediction section 14 is correct (when the prediction of a slide operation is correct), the determination section 26 determines that refreshing the screen currently being displayed on the display 308B is possible.

When the determination section 26 has determined that refreshing the screen currently being displayed on the display 308B is possible, the screen currently being displayed on the display 308B is refreshed by replacing the screen currently being displayed on the display 308B with the first prediction stage-generated screen data.

The duration $T_{tp\text{-}dis}$ illustrated in FIG. 26 is the required duration from the start of slide operation of the touch panel 308A until the execution section 16 performs control to refresh the screen. The duration $T_{tp\text{-}dis}$ is expressed by Formula (3) below, and is shorter than the duration $T_{tp\text{-}dis}$ of the Comparative Example illustrated in FIG. 33 by the duration Ttpf. Namely, in comparison to the smartphone 300 explained in the Comparative Example, the smartphone 10 is capable of reducing by the duration Ttpf the required duration from the start of a contact operation of the touch panel 308A until the execution of processing according to the contact operation.

$$\text{Duration} T_{tp\text{-}dis} = T\text{tps} + T\text{dis} \qquad (3)$$

Next, explanation follows regarding a flow of processing performed by the computer 40 and the touch panel 308A, illustrated in FIG. 27. Note that in the example illustrated in FIG. 27, for ease of explanation a case is illustrated in which the start of contact to the touch panel 308A by one out of 2 instructing bodies is followed by the start of contact to the touch panel 308A by the other of the instructing bodies after a delay of duration Tfdly. Moreover, in the example illustrated in FIG. 27, the processing performed by the computer 40 is illustrated by the functions realized by the prediction section 14, the execution section 16 and the determination section 26.

As illustrated in FIG. 27, at the start of contact to the touch panel 308A by the one instructing body, the touch panel 308A detects the contact of the instructing body, and outputs contact position data At (0) to the prediction section 14 after the duration Ttps. The prediction section 14 acquires the contact position data At (0) output from the touch panel 308A.

When the touch panel 308A has output the contact position data At (0), the touch panel 308A outputs contact position data At (n) to the prediction section 14 at every duration Ttpf until the contact state of the instructing body is released. The prediction section 14 acquires the contact position data At (n) every time the contact of the instructing body is detected and the contact position data At (n) is output by the touch panel 308A.

At the start of contact to the touch panel 308A by the other instructing body, the touch panel 308A outputs contact position data Bt (0) to the prediction section 14 after a specific timing from the detection of instructing body contact. The specific timing means, for example, a point in time the duration Ttpf after the touch panel 308A has output the contact position data At (0) (in the example illustrated in FIG. 27, a point in time a duration Ttps' after the detection of instructing body contact). The prediction section 14 acquires the contact position data Bt (0) output from the touch panel 308A. When the touch panel 308A has output the contact position data Bt (0), the touch panel 308A then outputs contact position data Bt (n) to the prediction section 14 at every duration Ttpf until the contact state of the instructing body is released. The prediction section 14 acquires the contact position data Bt (n) every time the instructing body is detected and the contact position data Bt (n) is output by the touch panel 308A.

When the prediction section 14 has acquired the contact position data At (0), the prediction section 14 predicts that the contact operation that is going to be attempted is a slide operation. Next, the execution section 16 generates the first prediction stage-generated screen data. Here, when the prediction section 14 acquires the contact position data At (1), Bt (0), the prediction section 14 changes to a prediction that the contact operation that is going to be attempted is a pinch operation. When the prediction is changed from a slide operation to a pinch operation, the execution section 16 deletes the first prediction stage-generated screen data and generates screen data (referred to below as "second prediction stage-generated screen data") expressing the next screen for display (an enlarged or reduced screen). The required duration to generate the second prediction stage-generated screen data is for example the duration Tdis.

When the prediction section 14 has further acquired the contact position data At (2), Bt (1), the prediction section 14 recognizes from the contact position data At (1), At (2), Bt (0), Bt (1) that the contact operation currently being performed is a pinch operation. The determination section 26 determines whether or not the prediction result of the prediction section 14 and the actual contact operation match each other. When the prediction result of the prediction section 14 is correct (when the prediction of a pinch operation is correct), the determination section 26 determines that refreshing the screen currently being displayed on the display 308B is possible.

When the determination section 26 has determined that refreshing the screen currently being displayed on the display 308B is possible, the screen currently being displayed on the display 308B is refreshed by replacing the screen currently being displayed on the display 308B with the second prediction stage-generated screen data.

The duration $T_{tp\text{-}dis}$ illustrated in FIG. 27 is the required duration from the start of pinch operation of the touch panel 308A until the execution section 16 performs control to refresh the screen. The duration $T_{tp\text{-}dis}$ is expressed by Formula (4) below, and is shorter than the duration $T_{tp\text{-}dis}$ of the Comparative Example illustrated in FIG. 34 by the duration Ttpf. Namely, in comparison to the smartphone 300 explained in the Comparative Example, the smartphone 10 is capable of reducing by the duration Ttpf the required duration from the start of a contact operation of the touch panel 308A until the execution of processing according to the contact operation.

$$T_{tp\text{-}dis} = T\text{tps} + T\text{tpf} + T\text{dis} \qquad (4)$$

Explanation follows regarding a flow of processing performed by the computer 40 and the touch panel 308A, illustrated in FIG. 28. FIG. 28 illustrates a case in which contact to the touch panel 308A by 2 instructing bodies starts at the same time. Note that "the same time" means, for example, when the start of contact by the first instructing body out of 2 instructing bodies is followed after a specific duration (for example a duration of ⅔ the duration Ttps) or less by the start of contact by the second instructing body.

As illustrated in FIG. 28, when contact to the touch panel 308A by 2 instructing bodies starts at the same time, the touch panel 308A detects the contact of the 2 instructing bodies and outputs contact position data At (0), Bt (0) to the prediction section 14 after the duration Ttps. The prediction section 14 acquires the contact position data At (0), Bt (0) output from the touch panel 308A. Here, when the prediction section 14 has acquired the contact position data At (0), Bt (0), the prediction section 14 predicts that the contact operation that is going to be attempted is a pinch operation. When the prediction section 14 has predicted a pinch operation, the execution section 16 generates the second prediction stage-generated screen data.

When the prediction section 14 has further acquired the contact position data At (1), Bt (1), the prediction section 14 recognizes from the contact position data At (1), At (0), Bt (1), Bt (0) that the contact operation currently being performed is a pinch operation. The determination section 26 determines whether or not the prediction result of the prediction section 14 and the actual contact operation match each other. When the prediction result of the prediction section 14 is correct (when the prediction of a pinch operation is correct), the determination section 26 determines that refreshing the screen currently being displayed on the display 308B is possible. When the determination section 26 has determined that refreshing the screen currently being displayed on the display 308B is possible, the screen is refreshed similarly to in the example illustrated in FIG. 27.

In the example illustrated in FIG. 28, the duration $T_{tp\text{-}dis}$ is the required duration from the start of pinch operation of the touch panel 308A until the execution section 16 performs of control to refresh the screen. The duration $T_{tp\text{-}dis}$ is expressed by Formula (5) below, and is shorter than the duration $T_{tp\text{-}dis}$ of the Comparative Example illustrated in FIG. 34 by the duration Ttpf. Namely, in comparison to the smartphone 300 explained in the Comparative Example, the smartphone 10 is capable of reducing by the duration Ttpf the required duration from the start of a contact operation of the touch panel 308A until the execution of processing according to the contact operation.

$$T_{tp\text{-}dis} = T\text{tps} + T\text{dis} \qquad (5)$$

Figure 29A:
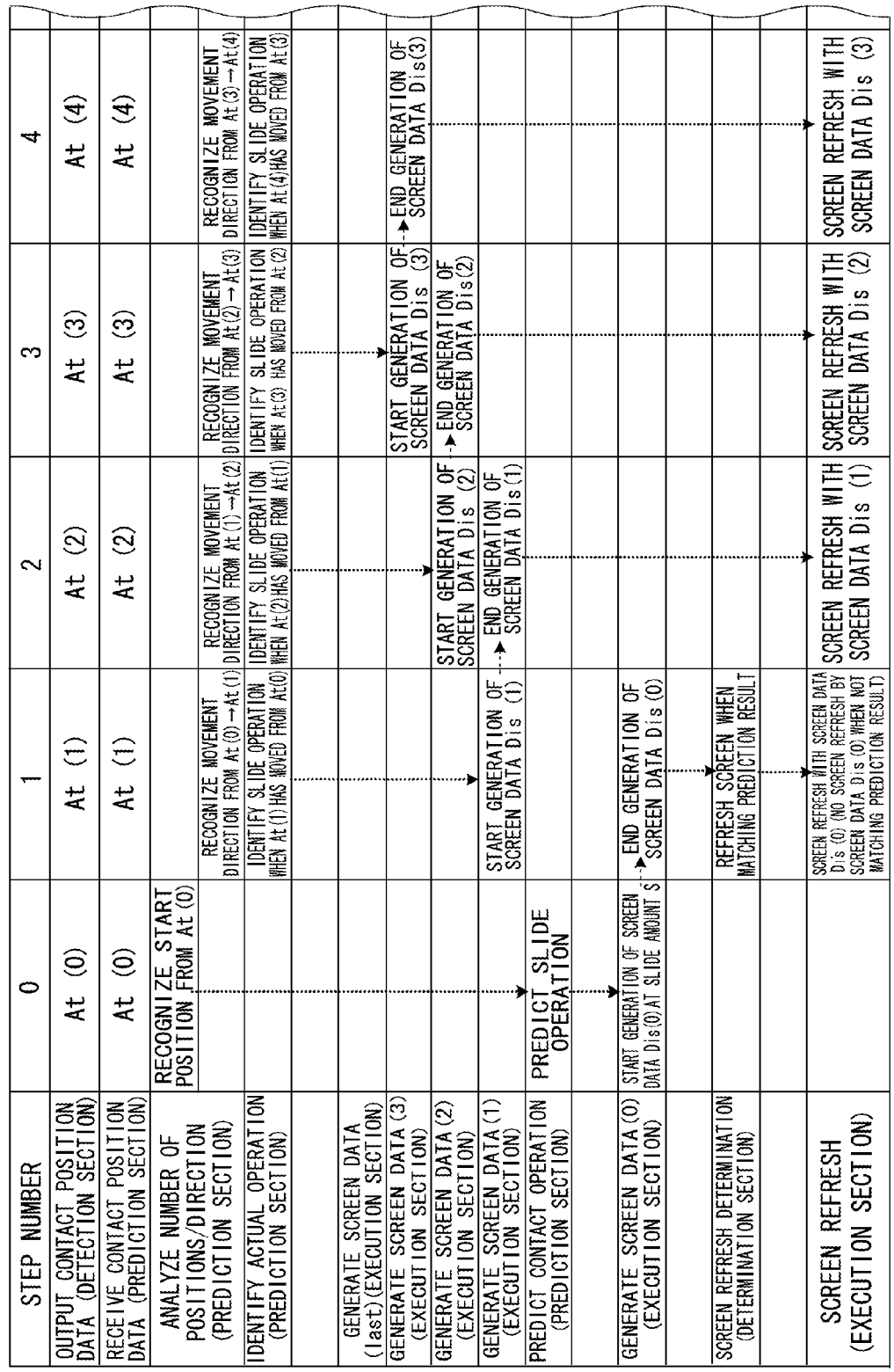
FIG. 29A is a sequence diagram illustrating the flow of processing illustrated in FIG. 26 in more detail.
Figure 29B:
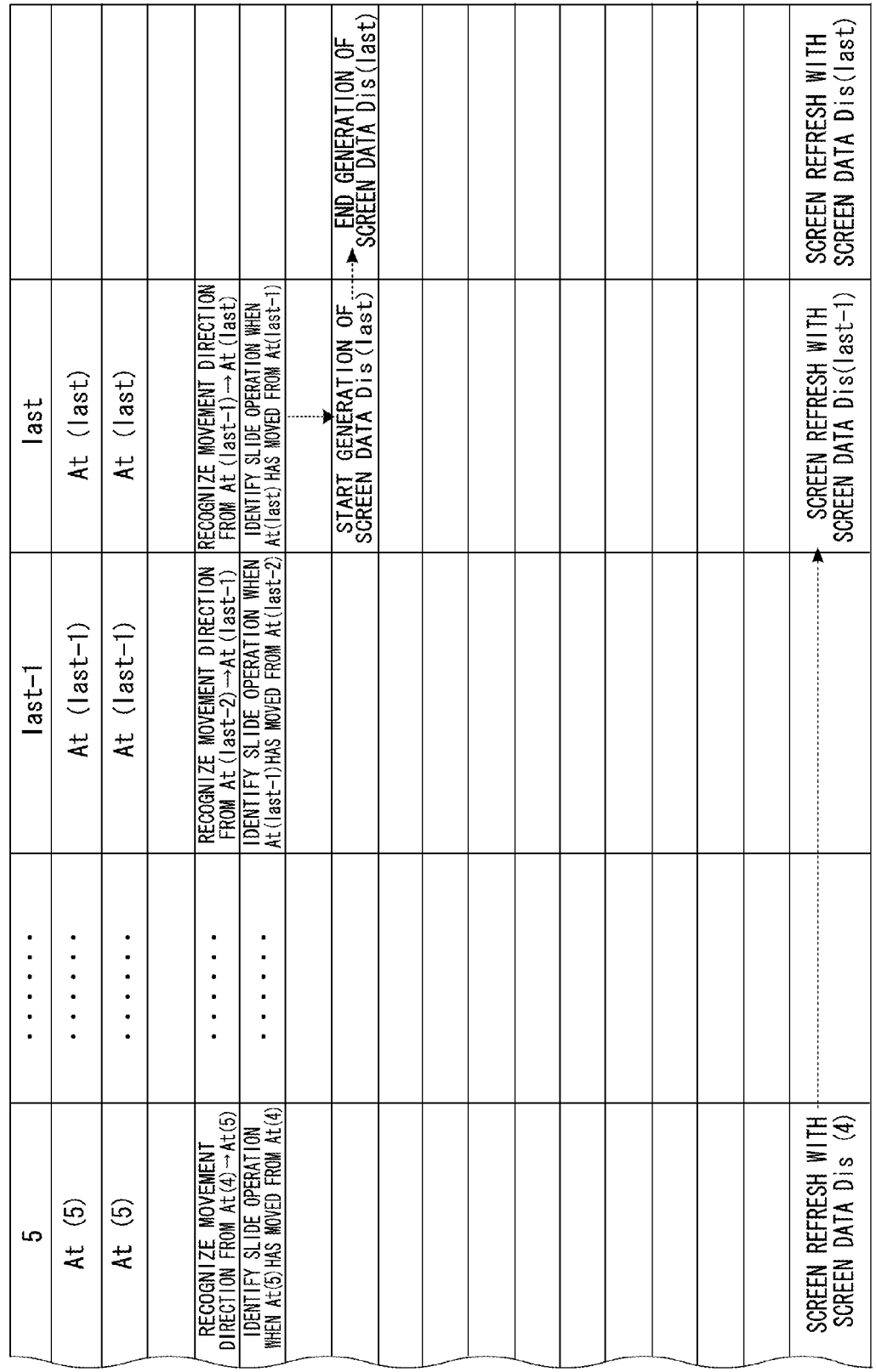
FIG. 29B is a continuation of the sequence diagram illustrated in FIG. 29A.

Explanation follows regarding a flow of processing illustrated in FIG. 29A and FIG. 29B. As illustrated in FIG. 29B and FIG. 29B, when a slide operation is performed, the detection section 12 outputs contact position data At (n) at every specific duration. The example illustrated in FIG. 29A and FIG. 29B illustrates from contact position data At (0)

expressing the start position until contact position data At (last) expressing the end position.

The prediction section 14 receives the contact position data At (0) output from the detection section 12, and recognizes the start position from the contact position data At (0). When the prediction section 14 has recognized the start position from the contact position data At (0), the prediction section 14 predicts a slide operation, and starts generation of screen data Dis (0) expressing a screen in which the screen currently being displayed has been moved by a slide amount S.

Next, when the prediction section 14 has acquired the contact position data At (1), the prediction section 14 recognizes the movement direction from the contact position data At (0), At (1). When the contact position data At (1) has moved from the contact position data At (0), the contact operation that is currently being performed is identified as a slide operation.

When the contact operation that is currently being performed has been identified as a slide operation, the execution section 16 starts generation of screen data Dis (1) expressing the next screen for display. At this point, the execution section 16 ends generation of the screen data Dis (0). When the prediction result of the prediction section 14 and the identified contact operation match each other (when the actual contact operation is a slide operation), the screen of the display 308B is refreshed based on the generated screen data Dis (0). Note that when the prediction result of the prediction section 14 and the identified contact operation do not match each other (when the actual contact operation is a pinch operation), the execution section 16 deletes the screen data Dis (0) and does not perform screen refresh based on the screen data Dis (0).

Next, when the prediction section 14 has acquired contact position data At (n) (for example At (2)), the prediction section 14 recognizes the movement direction from the contact position data At (n−1) (for example At (1)), At (n). Moreover, when the contact position data At (n) has moved from the contact position data At (n−1), the contact operation that is currently being performed is identified as a slide operation. When the contact operation that is currently being performed has been identified as a slide operation, the execution section 16 starts generation of screen data Dis (n) expressing the next screen for display. At this point, the execution section 16 ends generation of the screen data Dis (n−1) and refreshes the screen of the display 308B based on the generated screen data Dis (n−1).

Figure 30A:
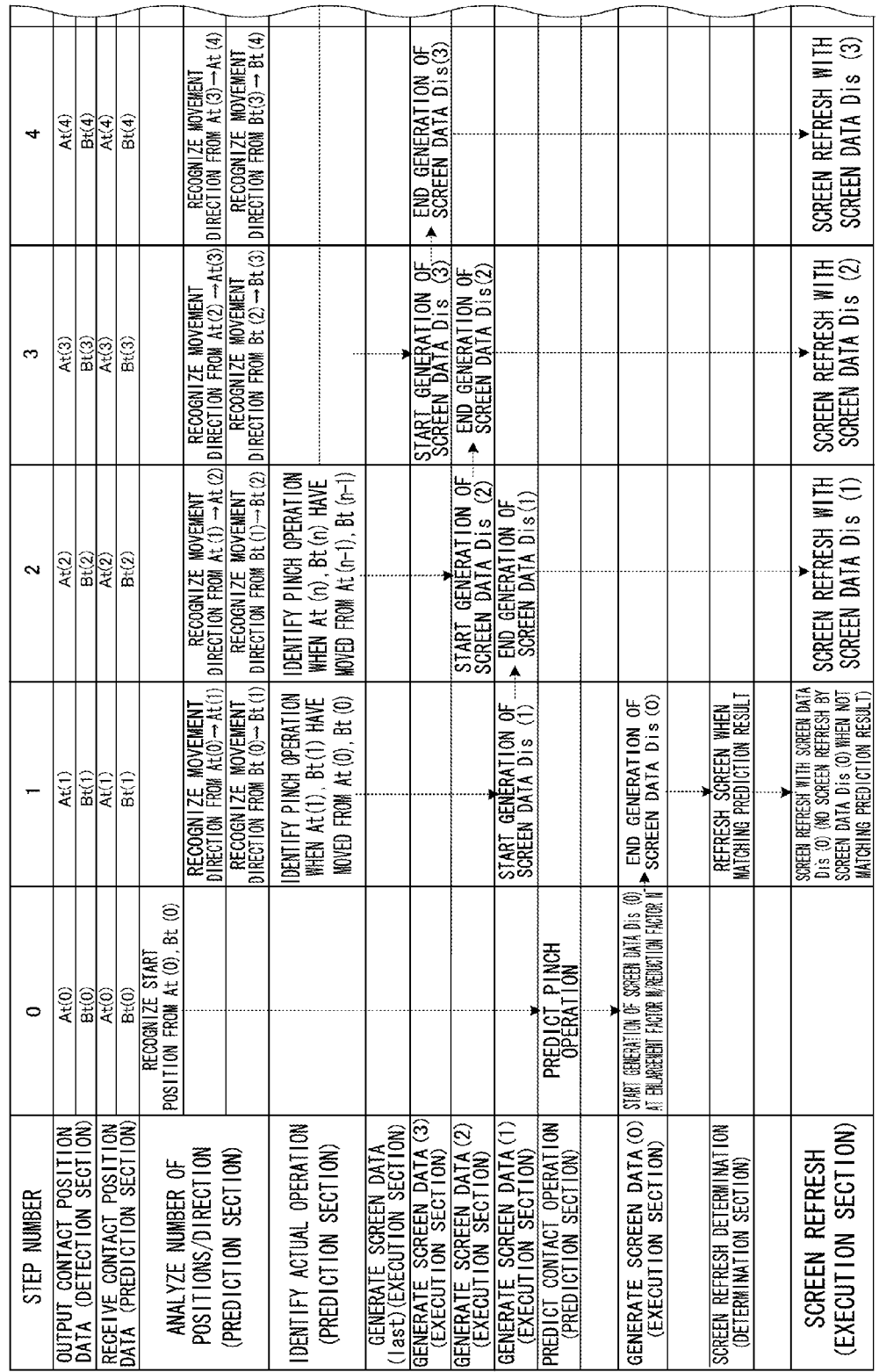
FIG. 30A is a sequence diagram illustrating the flow of processing illustrated in FIG. 28 in more detail.

Next, explanation follows regarding a flow of processing illustrated in FIG. 30A and FIG. 30B. As illustrated in FIG. 30A and FIG. 30B, when a pinch operation is performed the detection section 12 the contact position data At (n), Bt (n) is output at every specific duration. The example illustrated in FIG. 30A and FIG. 30B illustrates from contact position data At (0), Bt (0) expressing the start positions until contact position data At (last), Bt (last) expressing the end positions.

The prediction section 14 receives the contact position data At (0), Bt (0) output from the detection section 12 and recognizes the start positions of the 2 instructing bodies on the touch panel 308A from the contact position data At (0), Bt (0). When the prediction section 14 has recognized the start positions from the contact position data At (0), Bt (0), the prediction section 14 predicts a pinch operation, and starts generation of screen data Dis (0) expressing a screen in which the screen currently being displayed has been enlarged or reduced by the enlargement factor M or the reduction factor N. Note that the enlargement factor M is employed when the contact operation of the touch panel 308A has been predicted to be a pinch-out operation, and the reduction factor N is employed when the contact operation of the touch panel 308A has been predicted to be a pinch-in operation.

Next, when the prediction section 14 has acquired the contact position data At (1), Bt (1), the prediction section 14 recognizes the movement direction of the contact position of one of the instructing bodies from the contact position data At (0), At (1), and recognizes the movement direction of the other of the instructing bodies from the contact position data Bt (0), Bt (1). When the contact position data At (1), Bt (1) have moved from the contact position data At (0), Bt (0), the contact operation that is currently being performed is identified as a pinch operation.

When the contact operation that is currently being performed is identified as a pinch operation, the execution section 16 starts generation of screen data Dis (1) expressing the next screen for display. At this point, the execution section 16 ends generation of the screen data Dis (0). When the prediction result of the prediction section 14 and the identified contact operation match each other (when the actual contact operation is a pinch operation), the screen of the display 308B is refreshed based on the generated screen data Dis (0). Note that when the prediction result of the prediction section 14 and the identified contact operation do not match each other (when the actual contact operation is a slide operation), the execution section 16 deletes the screen data Dis (0), and screen refresh based on the screen data Dis (0) is not performed.

Next, when the prediction section 14 has acquired contact position data At (n) (for example At (2)), Bt (n) (for example Bt (2)), the prediction section 14 recognizes the movement directions from the contact position data At (n−1) (for example At (1)), At (n) and the contact position data Bt (n−1), Bt (n). Moreover, when the contact position data At (n), Bt (n) have moved from the contact position data At (n−1), Bt (n−1), the contact operation that is currently being performed is identified as a pinch operation. When the contact operation that is currently being performed has been identified as a pinch operation, the execution section 16 starts generation of screen data Dis (n) expressing the next screen for display. At this point, the execution section 16 ends generation of the screen data Dis (n−1) and refreshes the screen of the display 308B based on the generated screen data Dis (n−1).

As described above, in the smartphone 10 of the present exemplary embodiment, the prediction section 14 predicts the contact operation based on the number of contact positions (start positions) prior to the contact operation of the touch panel 308A being identified. The execution section 16 executes processing according to the contact operation predicted by the prediction section 14. The smartphone 10 of the present exemplary embodiment is accordingly capable of achieving a reduction in the required duration from the start of a contact operation of the touch panel 308A until execution of processing according to the contact operation by way of a simple configuration.

Moreover, in the smartphone 10 of the present exemplary embodiment, the prediction section 14 predicts that a contact operation is a slide operation when the number of start positions is 1. The prediction section 14 predicts that a contact operation is a pinch operation when there are a plural number of start positions. The smartphone 10 of the present exemplary embodiment accordingly enables easy prediction of whether a contact operation is a slide operation or a pinch operation.

Moreover, in the smartphone 10 of the present exemplary embodiment, when the number of start positions increases after the prediction section 14 has predicted a slide operation and prior to a slide operation being identified, the contact operation prediction is changed from a slide operation to a pinch operation. The smartphone 10 of the present exemplary embodiment accordingly enables incorrect prediction of a slide operation when a pinch operation is being performed to be suppressed.

Moreover, in the smartphone 10 of the present exemplary embodiment, when the prediction section 14 has predicted that a contact operation is a slide operation, the prediction section 14 predicts the contact position slide direction from a positional relationship between the start position and the reference line. The smartphone 10 of the present exemplary embodiment accordingly enables prediction of the slide direction of a slide operation.

Moreover, in the smartphone 10 of the present exemplary embodiment, the reference line reset section 18 resets the reference line on the touch panel 308A so as to position the reference line between a start position and an end position of a slide operation performed in the past. The smartphone 10 of the present exemplary embodiment accordingly enables a drop in the prediction precision of the slide direction of slide operations to be suppressed.

Moreover, in the smartphone 10 of the present exemplary embodiment, when the prediction section 14 has predicted that a contact operation is a slide operation, the prediction section 14 predicts the contact position slide direction from a positional relationship between the start position and a reference point. The smartphone 10 of the present exemplary embodiment accordingly enables prediction of the slide direction of a slide operation.

Moreover, in the smartphone 10 of the present exemplary embodiment, the reference point reset section 20 resets the reference point on the touch panel 308A so as to position the reference point between a start position and an end position of a slide operation performed in the past. The smartphone 10 of the present exemplary embodiment accordingly enables a drop in the prediction precision of the slide direction of slide operations to be suppressed.

Moreover, in the smartphone 10 of the present exemplary embodiment, when the distance between the pair of contact positions in a pinch operation is the pinch discrimination distance L1 or less, the prediction section 14 predicts a pinch-out operation. When the distance between the pair of contact positions in a pinch operation exceeds the pinch discrimination distance L1, the prediction section 14 predicts a pinch-in operation. The smartphone 10 of the present exemplary embodiment accordingly enables easy prediction of whether a pinch operation is a pinch-out operation or a pinch-in operation.

Moreover, in the smartphone 10 of the present exemplary embodiment, the pinch discrimination distance L1 is refreshed, employing as the pinch discrimination distance L1 a value corresponding to a distance between the distance between the pair of start positions and the distance between the pair of end positions of a past pinch operation. The smartphone 10 of the present exemplary embodiment accordingly enables a drop in the prediction precision of the type of pinch operation to be suppressed.

Moreover, in the smartphone 10 of the present exemplary embodiment the execution section 16 displays a screen according to the contact operation that has been predicted by the prediction section 14 on the display 308B. The smartphone 10 of the present exemplary embodiment accordingly enables a reduction in the required duration from the start of a contact operation of the touch panel 308A until a screen according to the contact operation is displayed to be achieved by way of a simple configuration.

Moreover, in the smartphone 10 of the present exemplary embodiment, the determination section 26 determines whether or not the prediction result of the prediction section 14 is correct by comparing against the contact operation identified from the time series of contact positions expressed by the contact position data output from the detection section 12. Moreover, when the determination section 26 determines that the prediction result of the prediction section 14 is correct, the execution section 16 displays on the display 308B a screen according to the contact operation predicted by the prediction section 14. The smartphone 10 of the present exemplary embodiment accordingly enables the display of screens that do not correspond to the contact operation to be suppressed.

Note that in the exemplary embodiment described above, an example has been given wherein the screen is refreshed according to a contact operation, however the technology disclosed herein is not limited thereto. For example, configuration may be made wherein communication is performed according to a contact operation. As an example of communication according to a contact operation, an embodiment may be implemented wherein an email is transmitted or an email interrogation is addressed to a server device (an interrogation as to whether or not unreceived emails are being stored on the server device) according to a contact operation.

In such cases, for example in a state in which a screen for transmitting an email is being displayed on the display 308B of the smartphone 10, an email is sent when a slide operation is performed on a region of the touch panel 308A corresponding to a specific display region. Namely, when the prediction section 14 has predicted that a contact operation is a slide operation, the execution section 16 designates an email transmission-enabled state and starts email transmission upon confirmation of a slide operation. A reduction in the required duration from the start of contact to the touch panel 308A until the start of email transmission is accordingly enabled in comparison to when prediction by the prediction section 14 is not performed.

In a state in which a screen for performing an email interrogation is being displayed on the display 308B of the smartphone 10, an interrogation is performed when a contact operation corresponding to a pinch-in operation is performed on a region of the touch panel 308A corresponding to a specific display region. Namely, when the prediction section 14 has predicted that a contact operation is a contact operation corresponding to a pinch-in operation, the execution section 16 designates an email interrogation-enabled state, and starts email interrogation upon confirmation of a pinch-in operation. A reduction in the required duration from the start of contact to the touch panel 308A until the start of email interrogation is accordingly enabled in comparison when prediction by the prediction section 14 is not performed.

The technology disclosed herein may also be applied in cases in which for example communication means are selected according to a contact operation. For example, an embodiment may be implemented wherein the smartphone 10 is installed with Bluetooth (registered trademark) and an infrared communication function as selectable communication means, with communication performed either by Bluetooth or the infrared communication function according to contact operation. Namely, when the prediction section 14 has predicted that a contact operation performed on a specific region of the touch panel 308A is a slide operation, the execution section 16 designates a Bluetooth communication-enabled state and Bluetooth communication is started upon confirmation of a slide operation. When the prediction section 14 predicts that a contact operation performed on a specific region of the touch panel 308A is a contact operation corresponding to a pinch operation, the execution section 16 designates an infrared communication function communication-enabled state. Infrared communication function communication is started upon confirmation of a contact operation corresponding to a pinch operation.

Figure 31:
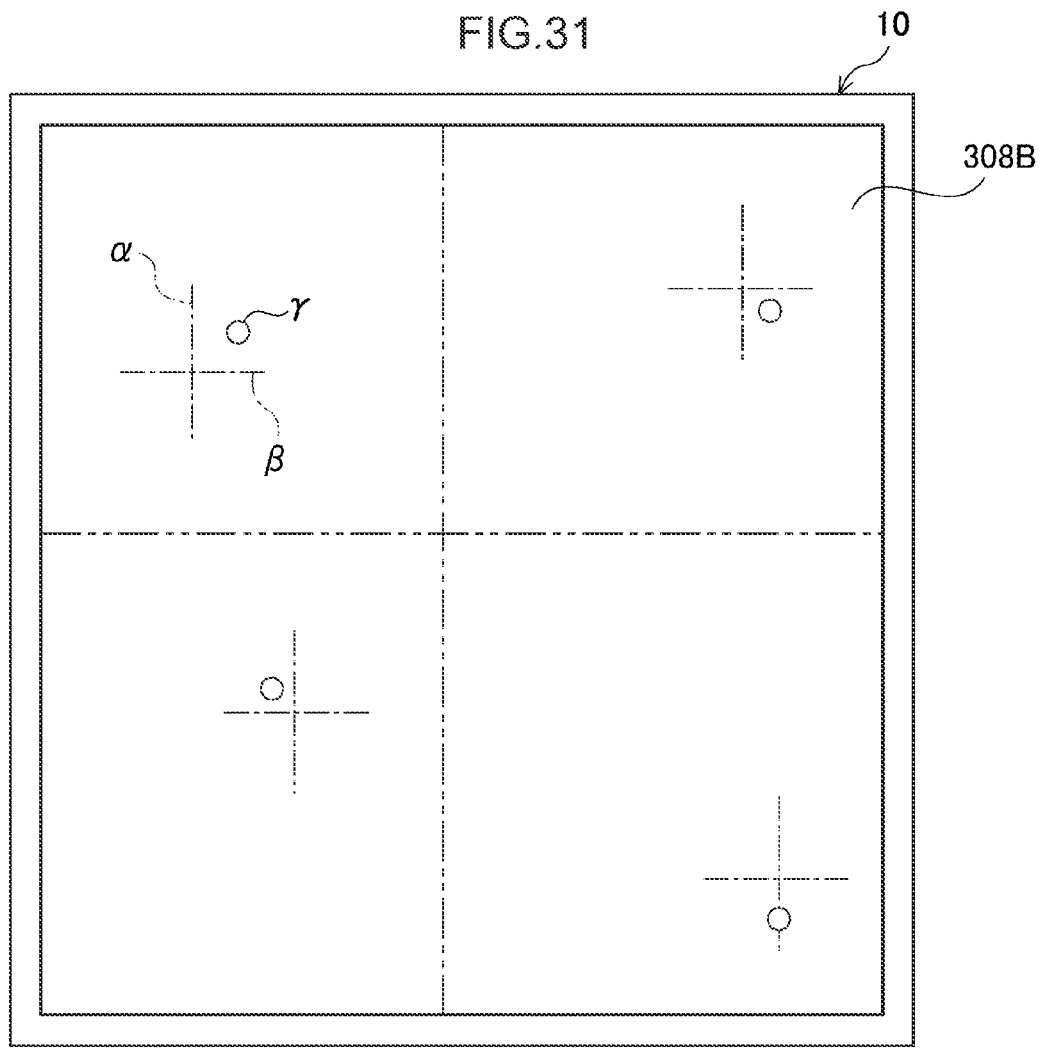
FIG. 31 is a schematic diagram illustrating an example of reference lines and reference points respectively applied to each divided region obtained by dividing into 4 a touch panel provided to a smartphone according to an exemplary embodiment.

In the exemplary embodiment described above, explanation has been given regarding a case in which the touch panel 308A has a single reference line and a single reference point, however the technology disclosed herein is not limited thereto, and the touch panel 308A may have plural reference lines and plural reference points. For example, as illustrated in FIG. 31, configuration may be made wherein the touch panel 308A is set with 1 reference line and 1 reference point for each divided region obtained by dividing the touch panel 308A into 4 in a matrix formation. In such cases, the prediction section 14 predicts the slide direction of a slide operation from a positional relationship between the contact position and the reference line, and predicts the slide direction of a slide operation from a positional relationship between the contact position and the reference point, in each of the divided regions. In the example illustrated in FIG. 31, a straight line α vertically crossing the divided region and a straight line β horizontally crossing the divided region are set in each of the divided regions, and a reference point γ is set in each of the divided regions. Accordingly, in the first slide operation preparation processing, the prediction section 14 determines whether or not the contact position is to the left hand side of the straight line α by divided region unit, and in the second slide operation preparation processing the prediction section 14 determines whether or not the contact position is to the upper side of the straight line β by divided region unit. In the third slide operation preparation processing, the prediction section 14 computes the angle of the slide direction by divided region unit.

Note that the example illustrated in FIG. 31 illustrates a case in which the touch panel 308A is divided into 4, however there is no limitation thereto, as long as the touch panel 308A is divided into plural regions and 1 reference line and 1 reference point are set in each of the divided regions.

There is no requirement to provide reference lines and reference points in each region obtained by dividing the touch panel 308A. Namely, reference lines and reference points may be provided to region(s) that have been acknowledged in advance to have a greater degree of importance than other region(s), and reference lines and reference points not set in the other region(s). When a contact operation is performed on the smartphone 10 outside of the predetermined region(s), the prediction section 14 does not perform prediction, and refreshing the screen according to a contact operation may be performed as hitherto.

In the exemplary embodiment described above, an example has been given wherein all of the contact position data output from the touch panel 308A in a contact operation is stored in time series in the specific storage region, however there is no requirement to store all of the contact position data. Namely, configuration may be made wherein the contact position data expressing the contact position and the respective contact position data expressing the 2 most recent contact positions are stored in time series in the specific storage region.

In the exemplary embodiment described above, an example has been given wherein the prediction section 14 predicts a pinch operation when there are 2 start positions, however there is no limitation thereto, and configuration may be made such that the prediction section 14 predicts a pinch operation even when 3 or more start positions are present. In such cases, out of the 3 or more start positions, for example the 2 instructing body contact start positions detected earliest by the touch panel 308A are employed as the pinch operation start positions.

Moreover, in the exemplary embodiment described above, an example has been given wherein the prediction section 14 predicts slide operation and pinch operation, however there is no limitation thereto, and the prediction section 14 may predict rotation operation. For example, the prediction section 14 may predict slide operation when there is one start position, predict pinch operation when there are 2 start positions, and predict rotation operation when there are 3 or more start positions. The prediction section 14 may moreover predict rotation operation when there are 2 start positions when a screen that is not capable of pinch operation but is capable of rotation operation is being displayed on the display 308B.

Figure 1:
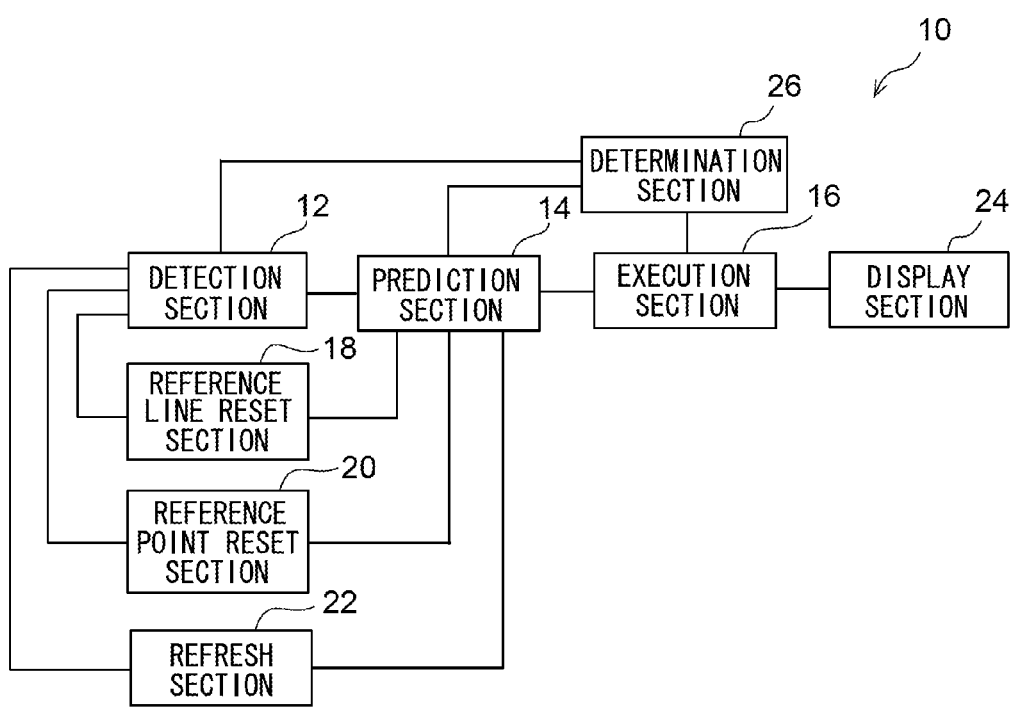
FIG. 1 is a functional block diagram illustrating an example of relevant functions of a smartphone according to an exemplary embodiment.

Moreover, in the exemplary embodiment described above, an example has been given wherein each section illustrated in the FIG. 1 (for example the prediction section 14, the execution section 16, the reference line reset section 18, the reference point reset section 20, the refresh section 22 and the determination section 26) is implemented by a software configuration, however the technology disclosed herein is not limited thereto. For example, one or more of the prediction section 14, the execution section 16, the reference line reset section 18, the reference point reset section 20, the refresh section 22 and the determination section 26 illustrated in FIG. 1 may be implemented by a hardware configuration. In such cases, the hardware resources employed may be for example an Application Specific Integrated Circuit (ASIC) that is an integrated circuit in which plural functions are consolidated into a single circuit, or a programmable logic device.

All cited documents, patent applications and technical standards are incorporated by reference herein to the same extent as if each of the documents, patent applications and technical standards were specifically and individually incorporated by reference into the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device comprising:
a processor; and
a memory storing instructions, which when executed by the processor perform a procedure, the procedure including:
(a) detecting contact with an operation face and outputting contact position data expressing a contact position at the operation face;

(b) predicting a contact operation based on a number of instructing bodies simultaneously contacting the operation face identified based on the contact position data output at (a) prior to the contact operation to the operation face being identified based on a time series of contact positions expressed by the contact position data output at (a); and (c) executing processing according to the contact operation predicted at (b), wherein (b) includes predicting that the contact operation is an enlarging or reducing operation, in which a distance between at least two of the contact positions at the operation face is enlarged or reduced, in a case in which there are a plurality of instructing bodies contacting the operation face at a time point.

2. The data processing device of claim 1, wherein:

(b) includes predicting that the contact operation is a slide operation in which the contact position is slid in a case in which the number of instructing bodies contacting the operation face is 1.

3. The data processing device of claim 2, wherein:

(b) includes changing the contact operation prediction from the slide operation to the enlarging or reducing operation in a case in which the number of instructing bodies contacting the operation face increases after the contact operation has been predicted to be the slide operation and before the contact operation to the operation face is identified as being the slide operation.

4. The data processing device of claim 2, wherein:

(b) further includes predicting a slide direction of the contact position of the slide operation based on a positional relationship between the contact position and a preset reference line at the operation face, in a case in which the contact operation is predicted to be the slide operation.

5. The data processing device of claim 4, wherein:

(b) includes, when a screen currently being displayed on a display region overlapping with the operation face is a screen that is capable of slide display in a direction horizontally crossing the display region, predicting the slide direction of the contact position based on a positional relationship between the contact position and a reference line that is a straight line vertically crossing the operation face.

6. The data processing device of claim 4, wherein:

(b) includes, when a screen currently being displayed on a display region overlapping with the operation face is a screen that is capable of slide display in a direction vertically crossing the display region, predicting the slide direction of the contact position based on a positional relationship between the contact position and a reference line that is a straight line horizontally crossing the operation face.

7. The data processing device of claim 4, wherein:

(b) includes, predicting the slide direction based on a positional relationship between the contact position, and any of the reference lines out of the reference lines respectively set in each of a plurality of divided regions obtained by dividing the operation face.

8. The data processing device of claim 7, wherein:

(b) further includes, predicting the slide direction of the contact position of the slide operation based on a positional relationship between the contact position and a preset reference point at the operation face, in a case in which the contact operation is predicted to be the slide operation.

9. The data processing device of claim 8, wherein:

(b) includes, predicting the slide direction based on a positional relationship between the contact position, and any of the reference points out of the reference points respectively set in each of the plurality of divided regions obtained by dividing the operation face.

10. The data processing device of claim 8, wherein the procedure further includes:

(e) resetting the reference point with respect to the operation face such that the reference point is positioned between a contact start position and a contact end position of the slide operation that was performed previously.

11. The data processing device of claim 10, wherein:

the memory stores the contact position data output at (b) in a time series; and (e) includes resetting the reference point with respect to the operation face such that the reference point is positioned between a contact start position and a contact end position of the slide operation that was performed previously based on the contact position data stored in the memory.

12. The data processing device of claim 4, wherein the procedure further includes:

(d) resetting the reference line with respect to the operation face such that the reference line is positioned between a contact start position and a contact end position of the slide operation that was performed previously.

13. The data processing device of claim 12, wherein:

the memory stores the contact position data output at (b) in a time series; and (d) includes resetting the reference line with respect to the operation face such that the reference line is positioned between a contact start position and a contact end position of the slide operation that was performed previously based on the contact position data stored in the memory.

14. The data processing device of claim 2, wherein:

(b) includes, in a case in which the distance between the at least two of the contact positions is a threshold value or less, predicting that the contact operation is an enlarging operation in which the distance between the pair of contact positions is enlarged out of the enlarging or reducing operation, and in a case in which the distance between the at least two of the contact positions exceeds the threshold value, predicting that the contact operation is a reducing operation in which the distance between the at least two of the contact positions is reduced out of the enlarging or reducing operation.

15. The data processing device of claim 14, wherein the procedure further includes:

(f) refreshing the threshold value to a value corresponding to between the distance between the at least two of the contact positions at contact start and the distance between the at least two of the contact positions at contact end for the enlarging or reducing operation that was performed in the past.

16. The data processing device of claim 1, further comprising a display, wherein:

(c) includes displaying a screen according to the contact operation predicted at (b) on the display.

17. The data processing device of claim 16, wherein the procedure further includes:

(g) determining whether or not the prediction result of (b) is correct by comparing the contact operation predicted at (b) against the contact operation identified based on a time series of the contact positions expressed by the contact position data output at (a); and (c) includes displaying the screen on the display in a case in which the prediction result of (b) has been determined at (g) to be correct.

18. The data processing device of claim 1, wherein:

the memory stores the contact position data output at (b) in a time series; and (b) includes predicting the contact operation based on a number of instructing bodies contacting the operation face identified based on the contact position data stored in the memory, prior to identifying the contact operation to the operation face based on a time series of contact positions expressed by the contact position data stored in the memory.

19. A data processing method comprising:

(a) by a processor, detecting contact with an operation face and outputting contact position data expressing a contact position at the operation face;

(b) by the processor, predicting a contact operation based on a number of instructing bodies simultaneously contacting the operation face identified based on the contact position data output at (a) prior to identifying the contact operation to the operation face based on a time series of contact positions expressed by the contact position data output at (a); and (c) by the processor, executing processing according to the contact operation predicted at (b), wherein (b) includes predicting that the contact operation is an enlarging or reducing operation, in which a distance between at least two of the contact positions at the operation face is enlarged or reduced, in a case in which there are a plurality of instructing bodies contacting the operation face at a time point.

20. A computer-readable recording medium having stored therein a program for causing a computer to execute a data processing process, the process comprising:

(a) predicting a contact operation based on a number of instructing bodies simultaneously contacting the operation face identified based on contact position data output from a detection section that detects contact with an operation face and outputs contact position data expressing contact positions at the operation face, prior to identifying the contact operation to the operation face based on a time series of the contact positions expressed by the contact position data output from the detection section; and (b) executing processing according to the contact operation predicted at (a), wherein (a) includes predicting that the contact operation is an enlarging or reducing operation, in which a distance between at least two of the contact positions at the operation face is enlarged or reduced, in a case in which there are a plurality of instructing bodies contacting the operation face at a time point.

* * * * *